(12) United States Patent
Matsuo

(10) Patent No.: US 8,698,670 B2
(45) Date of Patent: Apr. 15, 2014

(54) HIGH SPEED HIGH RESOLUTION WIDE RANGE LOW POWER ANALOG CORRELATOR AND RADAR SENSOR

(75) Inventor: Michiaki Matsuo, San Jose, CA (US)

(73) Assignee: Panasonic Corporation, Osaka (JP)

(*) Notice: Subject to any disclaimer, the term of this patent is extended or adjusted under 35 U.S.C. 154(b) by 545 days.

(21) Appl. No.: 13/151,169

(22) Filed: Jun. 1, 2011

(65) Prior Publication Data
US 2012/0306687 A1   Dec. 6, 2012

(51) Int. Cl.
*G01S 13/08* (2006.01)
*G01S 13/00* (2006.01)

(52) U.S. Cl.
USPC ........... 342/189; 342/118; 342/127; 342/131; 342/132; 342/145

(58) Field of Classification Search
CPC ..... G01S 13/284; G01S 13/282; G01S 13/28; G01S 13/288; G01S 7/023; G01S 7/282; G01S 13/582; G01S 13/24; G01S 13/34; G01S 7/288; G01S 15/8959; G01S 7/2813; G01S 7/292; G01S 2007/2886
USPC ........... 342/28, 118, 127, 130–136, 145, 189, 342/194
See application file for complete search history.

(56) References Cited

U.S. PATENT DOCUMENTS

| | | | | |
|---|---|---|---|---|
| 4,176,351 A * | 11/1979 | DeVita et al. | ................. | 342/111 |
| 4,237,461 A * | 12/1980 | Cantrell et al. | ............... | 342/194 |
| 4,353,067 A * | 10/1982 | Mims | ............................ | 342/201 |
| 4,509,051 A * | 4/1985 | Lewis | ........................... | 342/196 |
| 4,661,819 A * | 4/1987 | Lewis | ........................... | 342/201 |
| 4,813,006 A * | 3/1989 | Burns et al. | ....................... | 708/5 |
| 4,894,660 A * | 1/1990 | Thomson et al. | ............. | 342/129 |
| 5,293,168 A * | 3/1994 | Faulkner | ....................... | 342/145 |
| 5,808,580 A * | 9/1998 | Andrews, Jr. | ................. | 342/162 |
| 8,035,551 B1 * | 10/2011 | Govoni | .......................... | 342/189 |
| 8,576,116 B2 * | 11/2013 | Matsuo | ......................... | 342/145 |
| 2007/0069943 A1 * | 3/2007 | Adams et al. | ................. | 342/130 |
| 2009/0174494 A1 * | 7/2009 | Kobayashi et al. | ........... | 332/109 |
| 2012/0306687 A1 * | 12/2012 | Matsuo | .......................... | 342/189 |
| 2013/0099959 A1 * | 4/2013 | Matsuo | .......................... | 342/189 |

* cited by examiner

*Primary Examiner* — Peter Bythrow

(57) ABSTRACT

A high speed high dynamic range and low power consumption analog correlator for use in a radar sensor. The analog correlator combines various pulse replication schemes with various parallel integrator architectures to improve the detection speed, dynamic range, and power consumption of conventional radar sensors. The analog correlator includes a replica generator, a multiplier, and an integrator module. The replica generator generates a template signal having a plurality of replicated pulse compression radar (PCR) pulses. The multiplier multiplies a received PCR signal with the plurality of replicated PCR pulses. The integrator module is coupled to the multiplier and configured to generate a plurality of analog correlation signals, each of which is based on the multiplying between the received PCR signal and one of the replicated PCR pulses.

25 Claims, 15 Drawing Sheets

HIGH SPEED HIGH RESOLUTION WIDE RANGE LOW POWER ANALOG CORRELATOR AND RADAR SENSOR

BACKGROUND OF THE INVENTION

1. Field of the Invention

The present invention relates generally to the field of radar sensors and more particularly to high speed high resolution wide range and low power analog correlators and radar sensors that incorporate the same.

2. Description of Related Art

Conventional radar sensors are widely used in detecting the positions of one or more targets. These conventional radar sensors may have various detection range capabilities. Generally, the detection range of high resolution radar sensors may be shorter than the detection range of low resolution radar sensors. Due to many design constraints, it may be difficult and/or cost inefficient for conventional radar sensors to achieve a high resolution and a high detection range at the same time.

For example, attempts have been made in using wideband signals to improve the resolution of the conventional radar sensors. However, these wideband signals typically have high thermal noise levels when compared to narrow band signals, which may be used in conventional radar sensors with low resolution. The high thermal noise levels lead to the deterioration of the signal-to-noise ratio (SNR) of the receivers of the conventional radar sensors. Due to this SNR deterioration, the conventional radar sensors may have difficulties in receiving the wideband signals reflected by remote targets. Consequently, these conventional radar sensors may suffer from a decline in dynamic range. Because the dynamic range represents a ratio between the power level of the strongest received signal and the power level of the weakest received signal, the decline of the dynamic range will diminish the gap between the maximum detectable distance and the minimum detectable distance of the conventional radar sensors. As this gap is diminished, the detection range of these conventional radar sensors will be reduced accordingly.

To address this SNR deterioration issues, another attempt has been made in deploying high signal-to-noise ratio (SNR) analog-to-digital converters (ADCs) to improve the dynamic range and the detection range of the receivers of the conventional radar sensors. These high SNR ADCs typically have a large number of bits when compared to the ADCs having a low SNR. In order to maintain a high resolution, these high SNR ADCs are sampled at a relatively high frequency. However, because of the large number of bits and the high sampling frequency, the power consumption of these radar sensors can be prohibitively high and thus render the implementation of these radar sensors impractical.

To resolve this power consumption issue, yet another attempt has been made in deploying conventional analog correlators to lower the sampling rate of the high SNR ADCs. However, these conventional analog correlators may have a relatively slow detection speed. This slow detection speed can substantially hamper the performance of these radar sensors because the detection time of these conventional analog correlators can be very long. As such, these radar sensors may be incapable of detecting fast moving targets. This deficiency may render the radar sensors unsuitable for use in many military and/or commercial applications that involve detecting fast moving targets.

Thus, there is a need for an economical radar sensor with high speed, high resolution, wide range and low power consumption.

SUMMARY OF THE INVENTION

The present invention can enable various improved analog correlators. In return the improved analog correlators can enable various improved radar sensors. The improved analog correlators can combine various transmission pulse replication schemes with various parallel integrator architectures to improve the detection speed of conventional analog correlators. Moreover, the improved analog correlators can adopt various time delay schemes to improve the dynamic range of conventional radar sensors. Furthermore, the improved analog correlators can deploy one or more variable gain amplifiers to relax the SNR requirement of the ADC. Accordingly, the improved analog correlators enable the improved radar sensors to achieve high speed, high resolution, wide range, and low power consumption.

In one embodiment, the present invention provides an analog correlator for use in a radar sensor having a transmitter and a receiver. The transmitter is used for transmitting a pulse compression radar (PCR) signal having a PCR pulse, and the receiver is used for receiving a reflected PCR signal. The analog correlator includes a replica generator, a multiplier, and an integrator module. The replica generator is used for generate a template signal having a plurality of replicated PCR pulses. Each of the plurality of replicated PCR pulses replicates the PCR pulse of the transmitted PCR signal. The plurality of replicated PCR pulses can be generated at a replication rate having an adjustable time delay relative to the transmitted PCR signal.

The multiplier is used for multiplying the received PCR signal with the plurality of replicated PCR pulses of the template signal. The integrator module is coupled to the multiplier, and it is configured to generate a plurality of analog correlation signals. Each of the analog correlation signals has a magnitude based on the multiplying between the received PCR signal and one of the replicated PCR pulses of the template signal.

In another embodiment, the present invention provides an analog correlator for use in a radar sensor having a transmitter and a receiver. The transmitter is used for transmitting a pulse compression radar (PCR) signal having a PCR pulse, and the receiver is used for receiving a reflected PCR signal. The analog correlator includes a replica generator, a multiplier, and an integrator module. The analog correlator is used for generating a first template signal and a second template signal. Each of the first and second template signals has a plurality of replicated PCR pulses replicating the PCR pulse of the transmitted PCR signal.

The replicated PCR pulses of the first and second template signals are replicated at a replication rate. The first template signal is delayed from the transmitted PCR signal by a first adjustable time. The second template signal is delayed from the transmitted PCR signal by a second adjustable time. The first adjustable time and the second adjustable time is relatively defined by a pulse width of the PCR pulse.

The multiplier is used for multiplying the received PCR signal with the plurality of replicated PCR pulses of the first template signal and with the plurality of replicated PCR pulses of the second template signal. The integrator module is coupled to the multiplier. The integrator module is configured to generate a plurality of first analog correlation signals based on the multiplying between the received PCR signal and the plurality of replicated PCR pulses of the first template signal. Moreover, the integrator module is configured to generate a plurality of second analog correlation signals based on the multiplying between the received PCR signal and the plurality of replicated PCR pulses of the first template signal.

In yet another embodiment, the present invention provides a radar sensor, which includes a pulse generator, a variable gain amplifier (VGA), an analog correlator, and a controller. The pulse generator is used for generating a pulse compression radar (PCR) signal for transmission, which includes a PCR pulse. The VGA is configured to amplify a received PCR signal based on a time period starting after the transmission of the PCR signal.

The analog correlator is connected to the pulse generator. The analog correlator is configured to generate a template signal including a plurality of replicated PCR pulses, each of which replicates the PCR pulse of the PCR signal at a replication rate having an adjustable time delay relative to the transmission of the PCR signal. Moreover, the analog correlator is configured to generate a plurality of analog correlation signals, each having a magnitude based on a multiplying between the amplified PCR signal and one of the replicated PCR pulses of the template signal. Furthermore, the analog correlator is configured to sample the plurality of analog correlation signals at a sampling rate. The sampling rate substantially synchronizes with the replication rate.

The controller is connected to the analog correlator. The controller is configured to detect a position of the target based on the sampled magnitude of each of the plurality of analog correlation signals. If the position of the target is not detected, the controller is configured to increase the adjustable time delay.

This summary is provided to introduce certain concepts and not to emphasize any key or essential features of the claimed subject matter per se.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

Reference will now be made in detail to the preferred embodiments of the invention which set forth the best modes contemplated to carry out the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Apparatus, systems and methods that implement the embodiment of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between reference elements. In addition, the first digit of each reference number indicates the figure in which the element first appears.

Figure 1:
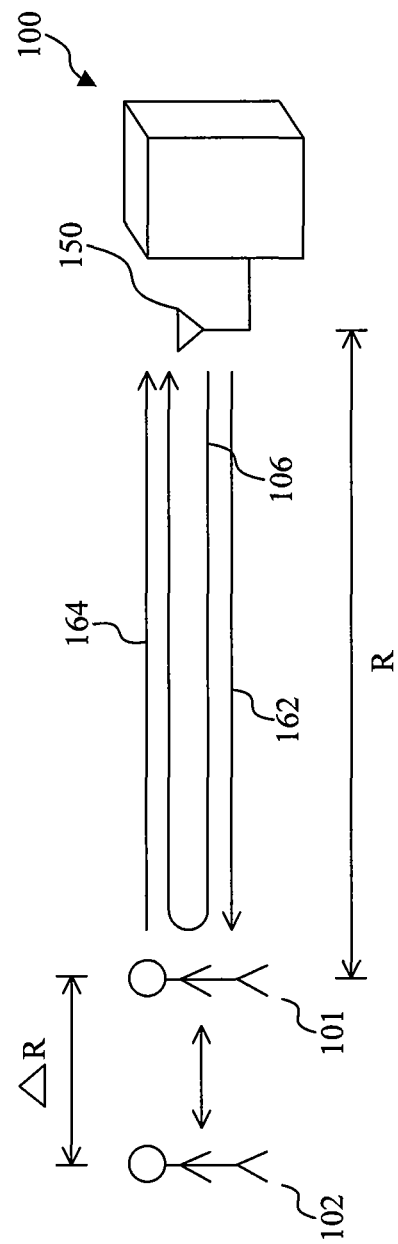
FIG. 1 shows a front view of a radar sensor for use in measuring the positions of two targets according to a first embodiment of the present invention.

FIG. 1 shows a front view of a radar sensor 100 for measuring the positions of two targets according to a first embodiment of the present invention. The radar sensor 100 can be part of a radar system. The radar sensor 100 has an antenna 150 for transmitting a radio frequency (RF) modulated signal 162. The transmitted RF modulated signal 162 has a carrier frequency and a code modulated message. The code modulated message can be a pulse compression radar (PCR) signal. The PCR signal can be modulated by using one or more digital modulation schemes, which may include but not be limited to, phase-shift keying (PSK), binary phase-shift keying (BPSK), frequency-shift keying (FSK), and/or amplitude-shift keying (ASK). Because of its encoded message, the transmitted RF modulated signal 162 may also be referred to as the transmitted PCR signal 162.

The transmitted PCR signal 162 will travel a distance R until it reaches a first target at a first position 101. The first target will then reflect the transmitted PCR signal 162. After being reflected, the transmitted PCR signal 162 becomes a reflected PCR signal 164. The reflect PCR signal 164 travels the distance R back to the antenna 150. At that point, the antenna 150 receives the reflected PCR signal 164.

After receiving the reflected PCR signal 164, the radar sensor 100 can extract the PCR signal from the reflected PCR signal 164. By correlating the extracted PCR signal with a template signal, the radar sensor 100 can determine a time of flight (TOF) 106 of the transmitted PCR signal 162 and the reflected PCR signal 164. The TOF 106 includes a first time duration for the transmitted PCR signal 162 to travel the distance R from the antenna 150 to the first target and a second time duration for the reflected PRC signal 164 to travel the distance from the first target back to the antenna 150.

Assuming C is the speed of light and ignoring any Doppler effect, the TOF 106 can be used for determining, deriving, and/or computing the value of the distance R according to the following equation:

$$R = TOF * (C/2)$$

The radar sensor 100 has a range resolution $\Delta R$, which is the minimum detectable range of position. In other words, the radar sensor 100 has a range resolution $\Delta R$ when it is able to detect a second target at a second position 102 and distinguish the second target from the first target given that the second target maintains at least a distance of $\Delta R$ from the first target. In general, the range resolution $\Delta R$ has a relationship with the bandwidth (BW) of a sub-pulse of a PRC signal pulse having a unit sub-pulse width $T_S$. As discussed herein but without imposing any limitation thereto, the bandwidth (BW) of the sub-pulse can be determined by the reciprocal of the unit sub-pulse width $T_S$. The detail of such relationship will be discussed in greater detail in the following sections. However, for the sake of simplicity, the range resolution $\Delta R$ can be characterized according to the following equation:

$$\Delta R = C/(2*BW)$$

In one embodiment, for example, the range resolution $\Delta R$ of the radar sensor 100 may range from about 75 cm to about 30 cm when the bandwidth (BW) of the sub-pulse ranges from about 200 MHz to about 500 MHz. In another embodiment, for example, the range resolution $\Delta R$ of the radar sensor 100 may range from about 30 cm to about 15 cm when the bandwidth (BW) of the sub-pulse ranges from about 500 MHz to about 1 GHz. In yet another embodiment, for example, the range resolution $\Delta R$ of the radar sensor 100 may range from about 15 cm to about 7.5 cm when the bandwidth (BW) of the sub-pulse ranges from about 1 GHz to about 2 GHz.

As discussed herein, a dynamic rage of a received radar signal depends on a ratio between the strongest received signal and the weakest received signal. Thus, a radar sensor having a high dynamic range has a wider range of detection area then a radar sensor having a low dynamic range. In order to detect target with a wide range of radar cross sections, the radar sensor 100 has a high dynamic range. By providing a relatively low range resolution $\Delta R$, the radar sensor 100 may have a relatively high dynamic range. Conventional radar sensors may have high power consumption when they are operated under a high dynamic range because of the high linearity design constraints of various circuit components, such as the analog-to-digital converter (ADC). The radar sensor 100 provides a solution to such a dilemma by using the analog correlator 110 reduce the power consumption of the ADC and to improve the overall detection speed. Unlike conventional radar sensors, the radar sensor 100 can execute one or more position detection schemes with a high dynamic range but without hampering the speed or increasing the power consumption of the operation. The detail implementation of these schemes will be discussed in the following section.

Figure 2:
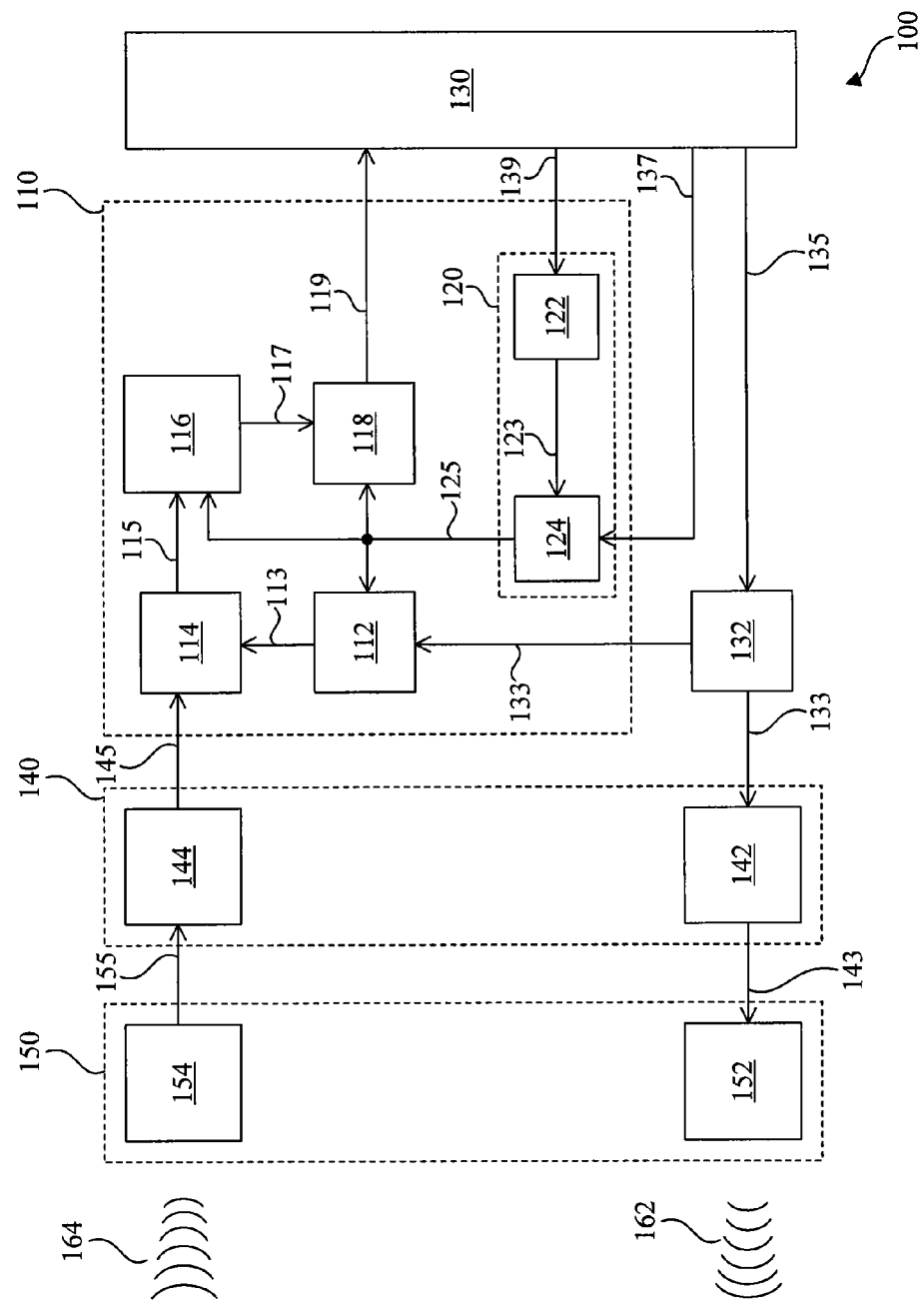
FIG. 2 shows a block diagram of the radar sensor according to the first embodiment of the present invention.

FIG. 2 shows a block diagram of the radar sensor 100 according to the first embodiment of the present invention. The radar sensor 100 includes an analog correlator 110, a timing module 120, a detection controller 130, a radio frequency (RF) front end 140, and an antenna 150. The detection controller 130 is responsible for controlling and coordinating the operations of various components in the radar sensor 100. In one implementation, for example, the detection controller 130 may initiate the generation of one or more pulse compression radar (PCR) signals during one or more detection cycles. In another implementation, for example, the detection controller 130 may control one or more timing components of the analog correlator 110 when the analog correlator 110 is correlating the reflected PCR signal 164 with a template signal 113. In yet another implementation, the detection controller 130 may process the output from the analog correlator 110 to determine and/or calculate the position of a target.

The detection controller 130 generates a detection cycle signal 135 at the beginning of each detection cycle. The radar sensor 100 includes a PCR signal generator 132, which can be coupled to the detection controller 130 and configured to receive the detection cycle signal 135. In response to the detection cycle signal 135, the PCR signal generator 132 generates an initial PCR signal 133, which includes a PCR pulse within every pulse repetition interval (PLI). The PCR pulse includes a digital code compressed by a coding method, such as the Complementary code and/or the Barker Code. As such, the PCR pulse includes a series of sub-pulses, each of which may represent one or more bits of compressed information.

Figure 5:
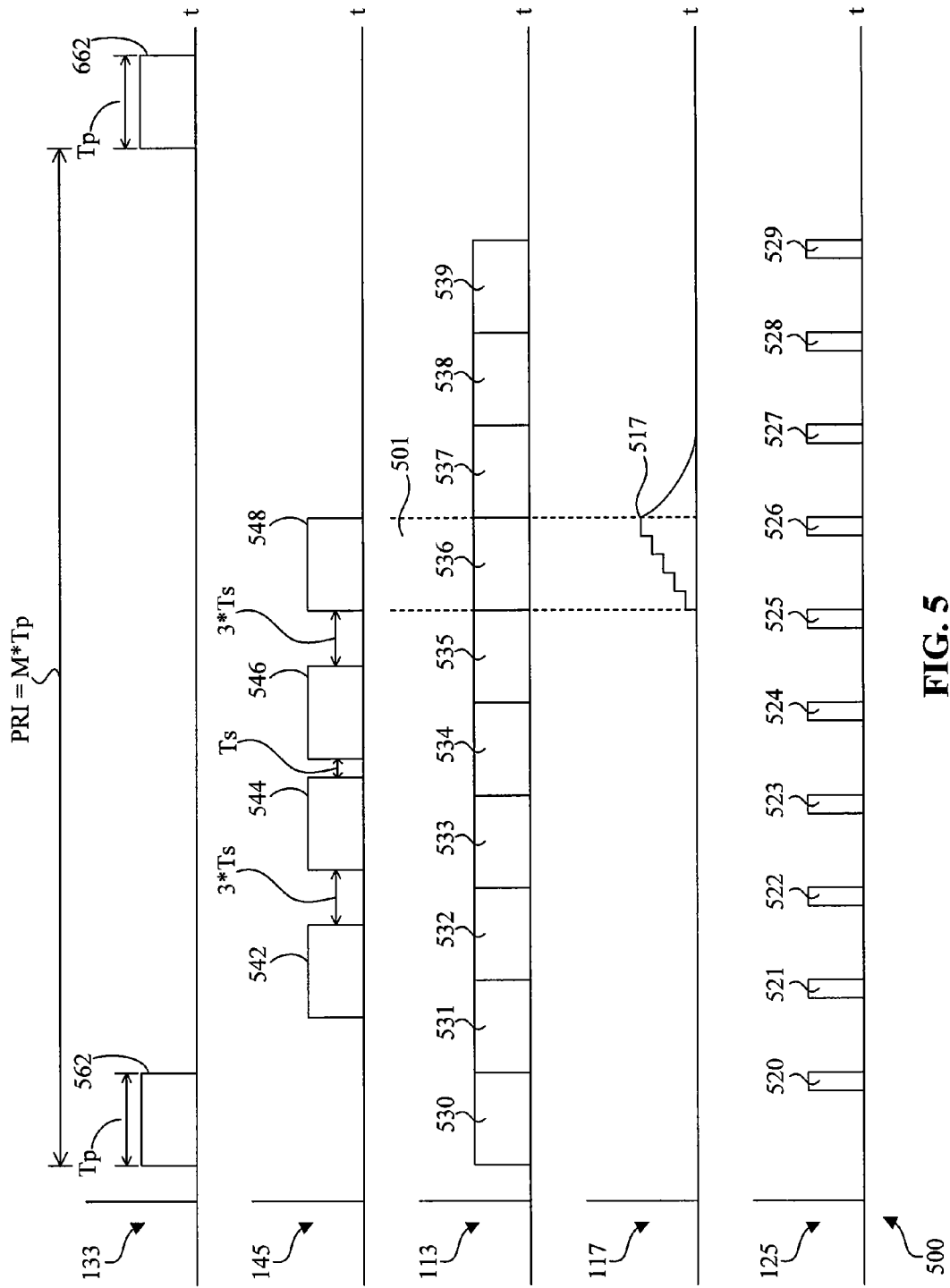
FIG. 5 shows various waveform diagrams of various signals during a first detection cycle according to the first embodiment of the present invention.

Referring to FIG. 5, which in part shows a waveform diagram of the initial PCR signal 133, the initial PCR signal 133 includes a first PCR pulse 562 at the beginning of a first detection cycle 500. The first PCR pulse 562 has a pulse width $T_P$. The pulse repetition interval PRI may be expressed as a multiple of the PCR pulse width $T_P$. Thus, if M is the number of PCR pulses that can be fitted into one detection cycle, the pulse repetition interval PRI may be expressed as $M*T_P$. In generally, the initial PCR signal 133 includes one PCR pulse during one detection cycle, and the duration of the pulse repetition interval PRI can be several times greater than the PCR pulse width $T_P$ of the PCR pulse. More specifically, the pulse repetition interval PRI defines the maximum detectable range R because it represents the maximum time of flight of a transmitted PCR signal 162. In one implementation, for example, the pulse repetition interval PRI may be greater than 220 ns, and the PCR pulse width $T_P$ may be less than 20 ns.

Referring again to FIG. 2, the initial PCR signal 133 initiates the target detection process. As such, the initial PCR signal 133 may also be referred to as the initial PCR signal 133. The initial PCR signal 133 can be prepared for transmission and be replicated at or around the same time. As previously discussed in FIG. 1, the transmitted PCR signal 162 may be reflected by a target, so that it will be received by the radar sensor 100 as a reflected PCR signal 164. The reflected PCR signal 164 is compared and/or correlated with the replicated signal (a.k.a. a template signal) in detecting the position of a target.

To prepare the initial PCR signal 133 for transmission, the RF front end 140 includes a RF modulator 142 to generate an outbound RF modulation signal 143. The outbound RF modulation signal 143 includes a carrier frequency and a message that is based on the initial PCR signal 133. In order to embed the message, the outbound RF modulation signal 143 may adopt one or more digital modulation schemes, which may include but not be limited to phase-shift keying (PSK), frequency-shift keying (FSK), and/or amplitude-shift keying (ASK).

After the outbound RF modulation signal 143 is generated and amplified to sufficient output level for transmission, a transmitting antenna 152 is used for converting the output modulation signal 143 to an electromagnetic wave and transmitting the converted output modulation signal 143 as the transmitted PCR signal 162. The transmitted PCR signal 162 is reflected by one or more targets. As such, a receiving antenna 154 receives one or more reflected PCR signals 164, and subsequently convert the reflected PCR signals 164 to one or more inbound RF modulation signals 155.

The RF front end 140 includes an RF demodulator 144 for demodulating the inbound RF modulation signals 155. The RF demodulator 144 adopts a demodulation scheme that corresponds with the modulation scheme applied by the RF modulator 142 in modulating the initial PCR signal 133. As a result of the demodulation, the RF demodulator 144 generates a received PCR signal 145, which includes the time domain messages embedded in several inbound RF modulation signals 155. Accordingly, the received PCR signals 145 may include one or more received PCR pulses. As shown in FIG. 5, for example, the received PCR signals 145 include: a first received PCR pulse 542, which represents a first target at a first position; a second received PCR pulse 544, which represents a second target at a second position; a third received PCR pulse 546, which represents a third target at a third position; and a fourth received PCR pulse 548, which represents a fourth target at a fourth position.

Each of the received PCR pulses (e.g., the first received PCR pulse 542, the second received PCR pulse 544, the third received PCR pulse 546, and/or the fourth received PCR pulse 548) is similar to the first initial PCR pulse 562. This is because each of the received PCR pulses is originated from the initial PCR pulse 562. As such, each of the received PCR pulses has substantially the same pulse width $T_P$ as the initial PCR pulse 562. Moreover, each of the received PCR pulses includes substantially the same compressed code sequence as the initial PCR pulse 562.

Figure 3:
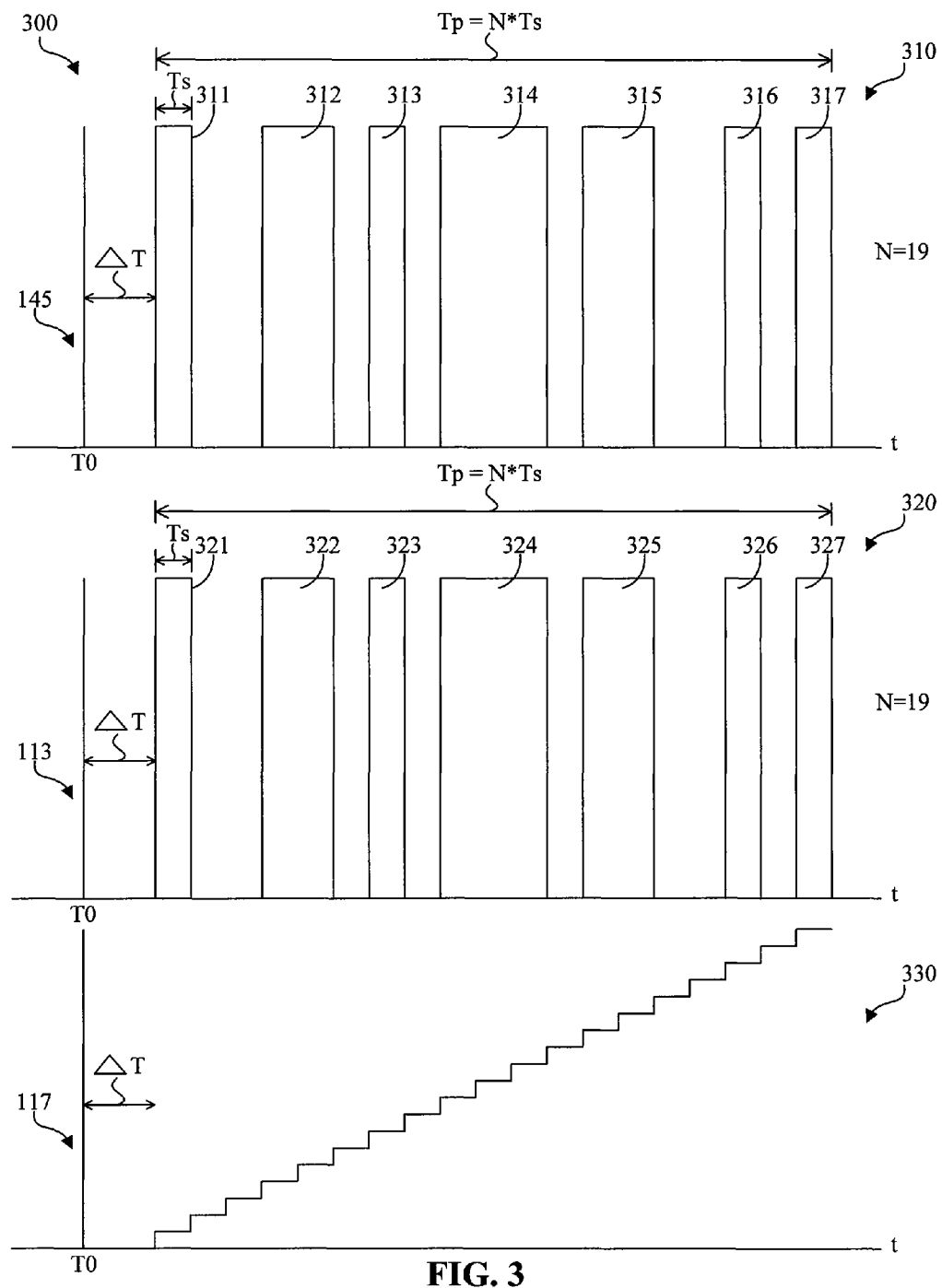
FIG. 3 shows various waveform diagrams of various signals in a correlation scenario according to the first embodiment of the present invention.

For purpose of illustrating the compressed code sequence of the received PCR pulse, FIG. 3 in part shows a waveform diagram of the received PCR signal 145. The received PCR signal 145 includes a received PCR pulse 310, which may exemplify the first received PCR pulse 542, the second received PCR pulse 544, the third received PCR pulse 546, and the fourth received PCR pulse 548. The received PCR pulse 310 is a delayed and reflected version of the initial PCR pulse (e.g., the first PCR pulse 562). The received PCR pulse 310 may include a series of sub-pulses separated by one or more zero-pulses. Each of the sub-pulses and the zero-pulses represents one or more bits of compressed information. As discussed herein, each bit of compressed information has a unit sub-pulse width $T_S$. Although FIG. 5 shows that the received PCR pulses do not overlap in time, the position detection scheme provided by the analog correlator 110 can detect and distinguish one or more received PCR pulses that overlap in time.

Accordingly, the PCR pulse width $T_P$ of the received PCR pulse 310, as well as the initial PCR pulse of the initial PCR signal 133, can be expressed as a multiple of the unit sub-pulse width $T_S$. For example, if the received PCR pulse 310 is compressed by an N-bit code sequence, the PCR pulse width $T_P$ of the received PCR pulse 310 can be expressed as $N*T_S$. For another example, if the received PCR pulse 310 includes 19 bits of compressed code sequence, the PCR pulse width $T_P$ of the received PCR pulse 310 can be expressed as $19*T_S$.

In one implementation, for example, the sub-pulses may include: a first sub-pulse 311 lasting for one unit sub-pulse width $T_S$ and representing a first binary bit; a second sub-pulse 312 lasting for two unit sub-pulse widths $T_S$ and representing a fourth and a fifth binary bits; a third sub-pulse 313 lasting for one unit sub-pulse width $T_S$ and representing a seventh binary bit; a fourth sub-pulse 314 lasting for three unit sub-pulse widths $T_S$ and representing a ninth, a tenth, and an eleventh binary bits; a fifth sub-pulse 315 lasting for two unit sub-pulse widths $T_S$ and representing a thirteenth and a fourteen binary bits; a sixth sub-pulse 316 lasting for one unit sub-pulse width $T_S$ and representing a seventeenth binary bit; and a seventh sub-pulse 317 lasting for one unit sub-pulse width $T_S$ and representing a nineteenth binary bit.

If each of these sub-pulses represents a binary value "1", the received PCR pulse 310 represents a 19-bit code sequence with a binary value of "1001101011101100101". On the other hand, if each of these sub-pulses represents a 19-bit code sequence with a binary value "0", the received PCR pulse 310 represents a binary of "0110010100010011010". Although FIG. 3 shows that the received PCR pulse 310 is unipolar, the received PCR pulse 310, as well as the initial PCR pulse of the initial PCR signal 133, can be bipolar. According to an alternative implementation, the received PCR pulse 310, as well as the initial PCR pulse of the initial PCR signal 133, may include positive sub-pulses and negative sub-pulses. The polarity scheme of the initial PCR pulse may depend on the types of modulation schemes used for up-converting. On one hand, for example, the bipolar scheme may be preferred when the binary phase-shift keying (BPSK) is used. On the other hand, for example, the unipolar scheme may be preferred when the on-off keying (OOK) is used.

Depending on the relative distance between a particular target and the radar sensor 100, the received PCR signal 145 may have a relative time delay (or time of flight) $\Delta T$ measured from the generation of the initial PCR signal 133 (or from the transmission of the transmitted PCR signal 162). For example, if the initial PCR signal 133 is generated, modulated, and transmitted at around time T0, the received PCR signal 145 may be received and demodulated at around time T0+$\Delta T$. Utilizing this time delay concept, the detection controller 130 can detect the relative distance between a particular target and the radar sensor 100 by determine the time delay $\Delta T$ between the initial time T0 and the time at which the received PCR signal 145 is received by the radar sensor.

The time delay $\Delta T$ can be determined by correlating the received PCR signal 145 with a template version of the initial PCR signal 133. Such correlation can be performed during one or more detection cycles. In each of the detection cycles, the template version of the initial PCR signal 133 may have a different time delay component. Generally, if a particular template version of the initial PCR signal 133 correlates with the received PCR signal 145, the detection controller 130 can determine that the time delay $\Delta T$ is substantially the same as the time delay component of the template version of the initial PCR signal 133. According to an implementation of the present embodiment, the template version of the initial PCR signal 133 may replicate the initial PCR pulses for multiple times within a single pulse repetition interval PRI.

To prepare the initial PCR signal 133 for replication, the analog correlator 110 includes a replica generator 112, which replicates the PCR pulse of the initial PCR signal 133 for multiple times. Consequently, the replica generator 112 generates a template signal 113, which includes a plurality of replicated PCR pulses being replicated at a replication rate. Unlike the initial PCR signal 133, which only includes one PCR pulse during one detection cycle, the template signal 113 includes multiple PCR pulses during one detection cycle.

For example, referring again to FIG. 5, the template signal 113 includes a train of replicated PCR pulses, which may include a first replicated PCR pulse 530, a second replicated PCR pulse 531, a third replicated PCR pulse 532, a fourth replicated PCR pulse 533, a fifth replicated PCR pulse 534, a sixth replicated PCR pulse 535, a seventh replicated PCR pulse 536, a eighth replicated PCR pulse 537, a ninth replicated PCR pulse 538, a tenth replicated PCR pulse 539. Each of the replicated PCR pulses has a pulse width that is substantially similar to the PCR pulse width $T_P$ of the first initial PCR pulse 562.

As such, the maximum number M of replicated PCR pulses can be predefined by a relationship between the pulse repetition interval PRI and the PCR pulse width $T_P$ of the first initial PCR pulse 562. In one implementation, for example, the maximum number of replicated PCR pulses may be M. In another implementation, for example, the maximum number of replicated PCR pulses may be M–1. In yet another embodiment, for example, the maximum number of replicated PCR pulses may be M–2. Although FIG. 5 shows that the first replicated PCR pulse 530 starts at about the same time as the first initial PCR pulse 562, the first replicated PCR pulse 530 may start at or around the end of the first initial PCR pulse 562.

Referring again to FIG. 2, the timing module 120 includes a sampling clock generator 122 and a variable time delay device (VTDD) 124. The sampling clock generator 122 and the VTDD 124 cooperate with each other for controlling the replication rate. Initially, the detection controller 130 sends a sampling control signal 139 to the sampling clock generator 122. The sampling control signal 139 may be related to the PCR pulse width $T_P$ of the initial PCR pulse, which in turn, is directly proportional to the number of code bits embedded in the initial PCR pulse.

The sampling control signal 139 is received by the sampling clock generator 122. Based on the sampling control signal 139, the sampling clock generator 122 generates a sampling signal 123 with a sampling rate. Because the sampling rate controls the frequency at which the replicated PCR pulses are replicated, the sampling rate is commensurate with the bandwidth of the initial PCR pulse. As discussed herein, the bandwidth of the initial PCR pulse can be a reciprocal of the PCR pulse width $T_P$, which is a multiple of the unit sub-pulse width $T_S$. As such, the bandwidth of the initial PCR pulse is much lower than the bandwidth of the unit sub-pulse of the initial PCR pulse. In one implementation, for example, the sampling rate may be substantially the same as the bandwidth of the initial PCR pulse. In another implementation, for example, the sampling rate may be a fraction of the bandwidth of the PCR pulse. As discussed herein but without imposing any limitation thereto, the bandwidth of the PCR pulse is a reciprocal of the PCR pulse width $T_P$ of the PCR pulse.

The detection controller 130 generates a delay adjustment signal 137 for selecting an option provided by the VTDD 124. Upon receiving and decoding the delay adjustment signal 137, the VTDD 124 enables an adjustable time delay $T_{DA}$. Then, the VTDD 124 applies the adjustable time delay $T_{DA}$ to the sampling signal 123 and thereby generates a replication rate signal 125. The replication rate signal 125 has a frequency component and a time delay component. The frequency component can be controlled by the sampling control signal 139, while the time delay component can be controlled by the delay adjustment signal 137.

The replica generator 112 can be coupled to the VTDD 124. Upon receiving the replication rate signal 125, the replica generator 112 begins replicating the initial PCR pulse (e.g., the first initial PCR pulse 562) according to the replication rate. As a result, the template signal 113 includes a plurality of replicated PCR pulses (e.g., the first replicated PCR pulse 530, the second replicated PCR pulse 531, the third replicated PCR pulse 532, the fourth replicated PCR pulse 533, the fifth replicated PCR pulse 534, the sixth replicated PCR pulse 535, the seventh replicated PCR pulse 536, the eighth replicated PCR pulse 537, the ninth replicated PCR pulse 538, and the tenth replicated PCR pulse 539).

The replicated PCR pulses have various delayed time with respect to the initial PCR pulse. Assuming n represents the numeric order of a particular replicated PCR pulse, the delayed time of that replicated PCR pulse can be characterized by the following equation:

$$T_{Dn} = T_{DA} + (n-1)*T_P$$

Referring again to FIG. 5, the adjustable time delay $T_{DA}$ during the first detection cycle 500 may be zero. Applying the zero adjustable time delay $T_{DA}$ to the above equation, the first replicated PCR pulse 530 has a first delayed time $T_{D1}$ of zero, while the second replicated PCR pulse 531 has a second delayed time $T_{D2}$ of $1*T_P$. Similarly, the third replicated PCR pulse 532 has a third delayed time $T_{D3}$ of 2*TP, while the fourth replicated PCR pulse 533 has a delayed time $T_{D4}$ of 3*TP.

One or more of the replicated PCR pulses are compared and matched with one of the received PCR pulses (e.g., the first received PCR pulse 542, the second received PCR pulse 544, the third received PCR pulse 546, and/or the fourth received PCR pulse 548). In theory, when a particular replicated PCR pulse substantially correlates with a particular received PCR pulse, the delayed time of the replicated PCR pulse can approximate the time of flight ΔT of the received PCR pulse.

The analog correlator 110 includes a multiplier 114 and an integrator for performing an autocorrelation between the template signal 113 and the received PCR signal 145. Generally, the multiplier 114 can be configured to multiply the received PCR signal 145 with the template signal 113. More specifically, the multiplier 114 can multiply each of the received PCR pulses with one or more of the replicated PCR pulses.

The multiplier 114 generates a multiplied signal 115 based on the result of such multiplying. In one implementation, for example, the multiplied signal 115 may conduct a predefined amount of positive charges when a code bit of the received PCR pulse matches with a code bit of the replicated PCR pulse. In another implementation, for example, the multiplied signal 115 may conduct a predefined amount of negative charges when a code bit of the received PCR pulse fails to match with a code bit of the replicated PCR pulse.

The integrator 116 is coupled to the multiplier 114, such that the integrator 116 can receive, store and accumulate the charges carried by the multiplied signal 115. Towards the end of each detection cycle, the integrator 116 generates an analog correlation signal 117 based on the total amount of charges accumulated therein. To further illustrate the operation of the multiplier 114 and the integrator 116, FIG. 3 will be discussed in conjunction with FIG. 4 in the following sections.

FIG. 3 shows the waveform diagrams a correlation scenario 300 between the received PCR pulse 310 and a replicated pulse 320. Similar to the received PCR pulse 310, the replicated PCR pulse 320 may include a plurality of sub-pulses, such as a first sub-pulse 321, a second sub-pulse 322, a third sub-pulse 323, a fourth sub-pulse 324, a fifth sub-pulse 325, a sixth sub-pulse 326, and a seventh sub-pulse 327. Because the replicated PCR pulse 320 include the same compression code sequence as the received PCR pulse 310, each of the sub-pulses of the replicated PCR pulse 320 has a sub-pulse width similar to its counterpart in the received PCR pulse 310.

When the replicated PCR pulse 320 aligns with the received PCR pulse 310, the multiplied signal 115 conducts a predefined amount of positive charges. Since the sub-pulses of the replicated PCR pulse 320 correlate in real-time with the sub-pulses of the received PCR pulse 310, the multiplied signal 115 delivers additional positive charge to the integrator 116 during each unit sub-pulse width $T_S$. Consequently, the analog correlation signal 117 is steadily increased during the PCR pulse width $T_P$, and it has an autocorrelation magnitude 330, which will exceed a predefined threshold towards the end of the PCR pulse width $T_P$.

Figure 4:
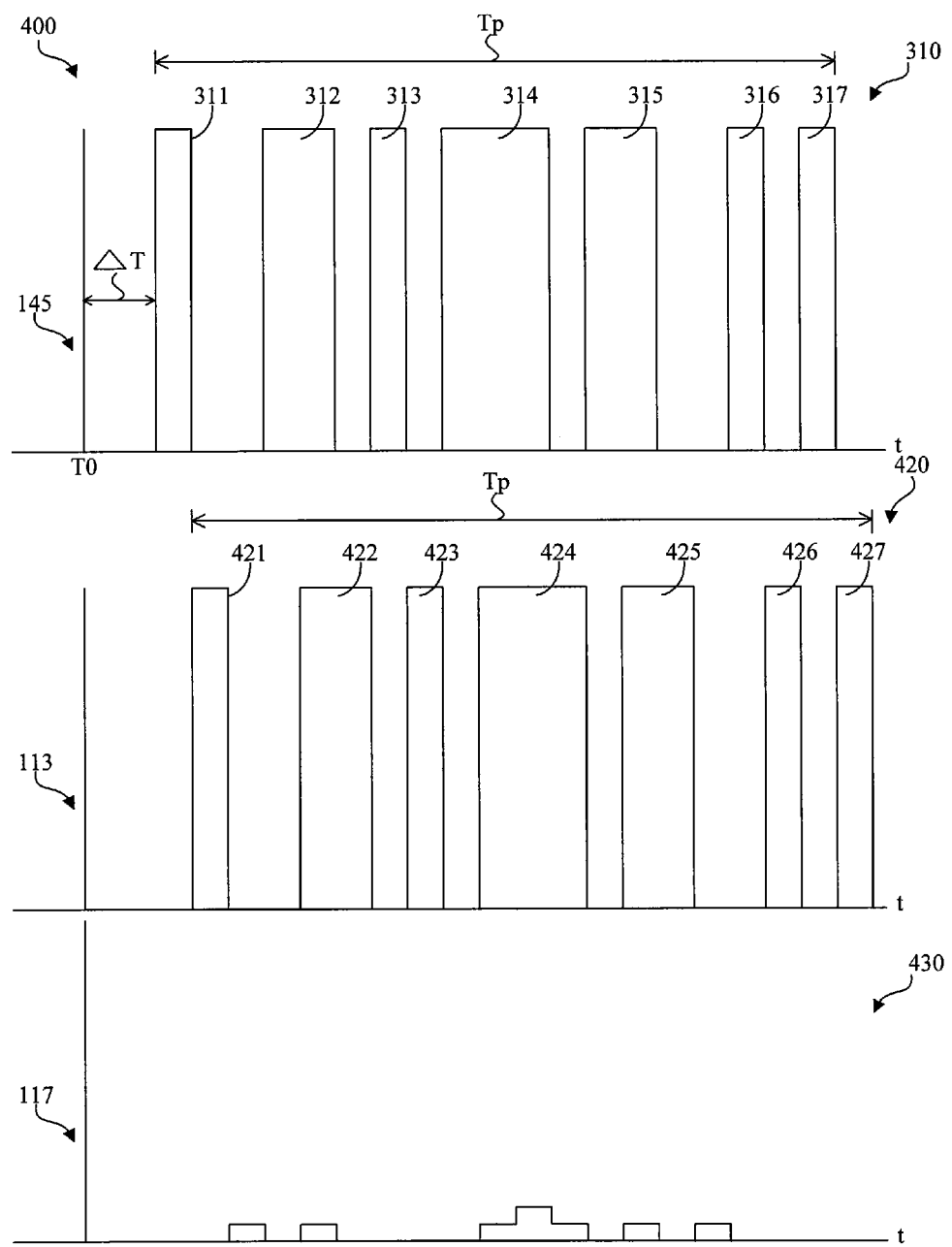
FIG. 4 shows various waveform diagrams of various signals in a mismatch scenario according to the first embodiment of the present invention.

On the other hand, FIG. 4 shows a mismatch scenario 400, in which the sub-pulses (e.g., a first sub-pulse 421, a second sub-pulse 422, a third sub-pulse 423, a fourth sub-pulse 424, a fifth sub-pulse 425, a sixth sub-pulse 426, and a seventh sub-pulse 427) of the replicated PCR pulse 420 do not fully correlate in real-time with the sub-pulses of the received PCR pulse 310. When the replicated PCR pulse 420 correlates with the received PCR pulse 310, positive charges is delivered to the integrator 116. However, when the replicated PCR pulse 420 mismatches with the received PCR pulse 310, negative charges is be delivered to the integrator 116. The negative charges can be substantially, if not completely, cancelled the positive charges. As a result, the analog correlation signal 117 has a low autocorrelation magnitude 430 when compared to the autocorrelation magnitude 330 in the correlation scenario 300.

The autocorrelation magnitude (e.g., the autocorrelation magnitude 330 or 430) of the analog correlation signal 117 can be sampled and digitized for further processing. In one implementation, for example, the analog correlator 110 may include an analog-to-digital converter (ADC) 118 to generate a digital signal 119 based on the sampling of the analog correlation signal 117. The sampling rate of the ADC 118 can be synchronized with the replication of the replicated PCR pulses. That is, the ADC 118 can sample the analog correlation signal 117 at the junction between two successive replicated PCR pulses. To achieve such synchronization, the ADC 118 is coupled with the variable time delay device (VTDD) 124, such that the ADC 118 can be controlled by the replication rate of the replication rate signal 125.

When the sampling process is completed, the charges accumulated by the integrator 116 will be released or discharged. As a result, the analog correlation signal 117 returns to its initial low autocorrelation magnitude, such as the autocorrelation magnitude 430, before the next replicated PCR pulse is being multiplied by the multiplier 114. Similar to the ADC 118, the charging and discharging of the integrator 116 can be synchronized with the replication of the replicated PCR pulses. To achieve such synchronization, the integrator 116 is coupled with the VTDD 124, such that the integrator 116 can be controlled by the replication rate of the replication rate signal 125.

Upon receiving the digital signal 119, the detection controller 130 can determine whether the last replicated PCR signal correlates with the received PCR signal 145. If the digital value of the digital signal 119 is less than a predefined digital threshold, the detection controller 130 will determine that the last replicated PCR pulse with a pulse width $T_P$ might not correlate with received PCR signal 145. On the other hand, if the digital value of the digital signal 119 passes the predefined digital threshold, the detection controller 130 will determine that the last replicated PCR pulse correlates with the received PCR signal 145. Consequently, the detection controller 130 can derive and/or calculate the time of flight of the received PCR pulse. For example, the detection controller 130 determines the number k of replicated PCR pulses that have been generated so far. Next, the detection controller 130 determines the adjustable time delay $T_{DA}$ imposed by the VTDD 124. With the number k and the adjustable time delay $T_{DA}$ as input parameters, the detection controller 130 can derive and/or calculate the time of flight TOF by applying these input parameters to the following formula:

$$TOF = k*T_P + T_{DA}$$

As discussed previously, the detection controller 130 uses the time of flight to compute the relative distance R of a detected target. This detection process can be repeatedly performed within a detection cycle and for each of the replicated PCR pulses. As such, multiple targets can be detected within one detection cycle. In one implementation, the detection process may be performed without altering the adjustable time delay $T_{DA}$ within a detection cycle. When the adjustable time delay $T_{DA}$ is not altered within a detection cycle, the ADC 118 can be switched at a relatively low frequency. Thus, the ADC 118 can achieve a high SNR while the sampling activities thereof can be kept at a minimum rate. Within each of the detection cycles, the radar sensor 100 delivers relatively robust performance with little power consumption. In another implementation, the replication process and the accumulating process may be iterated within a single detection cycle in order to improve the SNR of the detection controller 130. The result from such iteration will be averaged to minimize the effect of thermal noise.

When a detection cycle is over, the detection controller 130 will update the delay adjustment signal 137 for altering the adjustable time delay $T_{DA}$. Such an alteration facilitates the fine tuning of the target detection process. As discussed previously, the range resolution ΔR of the radar sensor 100 is defined by the unit sub-pulse width $T_S$ of the initial PCR pulse. When the adjustable time delay $T_{DA}$ is increased or decreased by a value substantially equals the unit sub-pulse width $T_S$, the radar sensor 100 can detect a position difference between adjacent targets or of a moving target with a precision that is substantially equals to the range resolution ΔR. As such, by controlling the value of the unit sub-pulse width $T_S$, the radar sensor 100 can control the detection precision. In one implementation, for example, the unit sub-pulse width $T_S$ may be adjusted to be less than 3.3 ns in order to achieve a range resolution ΔR to be higher than 0.5 m.

At the transitions of successive detection cycles, the detection controller 130 may augment the adjustable time delay $T_{DA}$ by a margin of the unit sub-pulse width $T_S$. Such augmentation allows the radar sensor 100 to sweep the entire detectable range R, with a range resolution ΔR, after going through a number of detection cycles. Accordingly, the radar sensor 100 can fine tune the detection process of each detection cycle. This fine tuning process helps lower the sampling rate of the ADC 118 without sacrificing the overall performance of the radar sensor 100.

In order to maintain a high signal-to-noise ratio (SNR), the radar sensor 100 can generate the PCR pulse with a relatively long code sequence. For example, an N-bit code can improve the SNR of the PCR signal by a process gain of 10*log(N). Because of the long code sequence, the ADC 118 will switch more often when a long coded pulse is being correlated. Hence, by virtue of reducing the sampling rate of the ADC 118, the overall power consumption of the radar sensor 100 can be limited significantly. The aforementioned position detection scheme allows the radar sensor 100 to achieve a relatively high resolution while maintaining a relatively high SNR and limiting the power consumption. By virtue of maintaining a high SNR, the radar sensor 100 can have a high dynamic range, which allows the radar sensor 100 to operate under a wide detection range. Advantageously, the analog correlator 110 and the aforementioned position detection scheme provide a high speed, high resolution, wide range, and low power solution to the conventional radar sensors.

Moreover, since the initial PCR pulse are generated, modulated, and transmitted only one time during a detection cycle, it is unlikely that any of the received PCR pulses will overlap with the initial PCR pulse (or the transmitted PCR pulse). That is, because within each detection cycle, the initial PCR pulse is generated in a discrete sequence, instead of a continuous sequence, the transmitted PCR signal is unlikely to interfere with the received PCR signal. By minimizing the interference between the transmitted PCR signal and the received PCR, the radar sensor 100 can maintain a relatively high SNR without consuming additional power.

In order to further elaborate the position detection scheme, the following sections discusses the waveform diagrams of various signals during several consecutive detection cycles. FIG. 5 shows the position detection scheme during a first detection cycle 500. The first detection cycle 500 involves five main signals, such as the initial PCR signal 133, the received PCR signal 145, the template signal 113, the analog correlation signal 117, and the replication rate signal 125. To start the first detection cycle 500, the first initial PCR pulse 562 is generated within the initial PCR signal 133. After the first initial PCR pulse 562 is generated, the initial PCR signal 133 will be modulated and transmitted.

For the purpose of demonstration, the transmitted PCR signal 162 is reflected by four separately positioned targets. As such, the received PCR signal 145 includes the first received PCR pulse 542, the second received PCR pulse 544, the third received PCR pulse 546, and the fourth received PCR pulse 548. The first received PCR pulse 542 leads the second received PCR pulse 544 by 3 unit sub-pulse width $T_S$ plus 1 PCR pulse width $T_P$. The second received PCR pulse 544 leads the third received PCR pulse 546 by 1 unit sub-pulse width $T_S$ plus 1 PCR pulse width $T_P$. The third received PCR pulse 546 leads the fourth received PCR pulse 548 by 3 unit sub-pulse width $T_S$ plus 1 PCR pulse width $T_P$. According to this reception sequence, the target associated with the first received PCR pulse 542 is closest to the radar sensor 100, whereas the target associated with the fourth received PCR pulse 548 is farthest away from the radar sensor 100.

During the first detection cycle 500, the adjustable time delay $T_{DA}$ can be zero to negligibly small such that the first replicated PCR pulse 530 is be substantially synchronized with the first initial PCR pulse 562. Because of the timing and the reception sequence of the received PCR pulses (e.g., the first, second, third, and fourth received PCR pulses 542, 544, 546, and 548), only the seventh replicated PCR pulse 536 establishes a correlation 501 with the fourth received PCR pulse 548. As a result of the correlation 501, the analog correlation signal 117 has an autocorrelation magnitude 517 when the received PCR signal 145 is multiplied with the seventh replicated PCR pulse 536. Meanwhile, the analog correlation signal 117 has a substantially zero magnitude when the received PCR signal 145 is multiplied with the other replicated PCR pulses (e.g., the first replicated PCR pulse 530, the second replicated PCR pulse 531, the third replicated PCR pulse 532, the fourth replicated PCR pulse 533, the fifth replicated PCR pulse 534, the sixth replicated PCR pulse 535, the eighth replicated PCR pulse 537, the ninth replicated PCR pulse 538, and the tenth replicated PCR pulse 539).

The analog correlation signal 117 is sampled and/or digitized at a rate that is substantially synchronized with the replication rate signal 125. In one implementation, for example, the analog correlation signal 117 may be sampled and/or digitized at the rising edge of each of the sampling pulses (e.g., the first sampling pulse 520, the second sampling pulse 521, the third sampling pulse 522, the fourth sampling pulse 523, the fifth sampling pulse 524, the sixth sampling pulse 525, the seventh sampling pulse 526, the eighth sampling pulse 527, the ninth sampling pulse 528, and the tenth sampling pulse 529). In another implementation, for example, the analog correlation signal 117 may be sampled and/or digitized at the falling edge of each of the sampling pulses. In yet another implementation, for example, the analog correlation signal 117 may be sampled and/or digitized during each of the sampling pulses.

After the analog correlation signal 117 is sampled and/or digitized, the position detection scheme detects a target during or after the seventh sampling pulse 526. The position detection scheme further determines that the detected target has a time of flight substantially equals 6 pulse widths $T_P$. Finally, the position detection scheme derives and/or calculates the position of the target based on the determined time of flight of the detected target.

Figure 6:
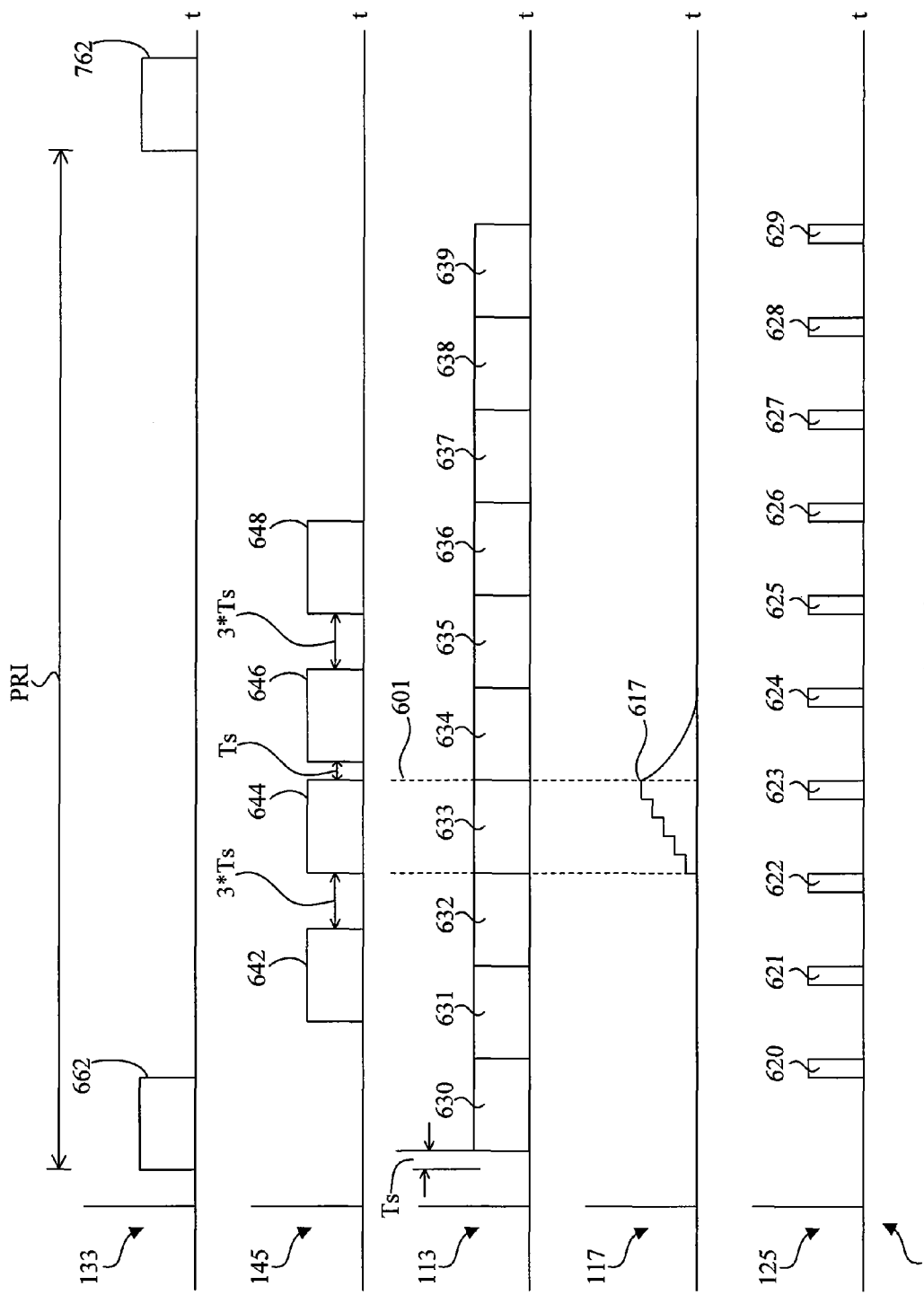
FIG. 6 shows various waveform diagrams of various signals during a second detection cycle according to the first embodiment of the present invention.

FIG. 6 shows the position detection scheme during a second detection cycle 600. The second detection cycle 600 involves the same signals as the first detection cycle 500. Transitioning from the first detection cycle 500 to the second detection cycle 600, a second initial PCR pulse 662 is generated in the initial PCR signal 133. After the second initial PCR pulse 662 is generated, the initial PCR signal 133 can be modulated and transmitted.

Assuming that the previously presented targets remain stationary, these targets reflect the transmitted PCR signal 162 again during the second detection cycle 600. As such, the received PCR signal 145 includes the first received PCR pulse 642, the second received PCR pulse 644, the third received PCR pulse 646, and the fourth received PCR pulse 648. Each of these received PCR pulses has a similar temporal relationship with one another as in the first detection cycle 500 because the relative distances of the four reflecting targets remain unchanged.

Thus, there are a first temporal separation of 3 unit sub-pulse width $T_S$ between the first received PCR pulse 642 and the second received PCR pulse 644, a second temporal separation of 1 unit sub-pulse width $T_S$ between the second received PCR pulse 644 and the third received PCR pulse 646, and a third temporal separation of 3 unit sub-pulse width $T_S$ between the third received PCR pulse 646 and the fourth received PCR pulse 648. According to this temporal relationship, the target associated with the first received PCR pulse 642 is closest to the radar sensor 100, whereas the target associated with the fourth received PCR pulse 648 is farthest away from the radar sensor 100.

After the first detection cycle 500, the adjustable time delay $T_{DA}$ will be augmented from zero to 1 unit sub-pulse width $T_S$ during the second detection cycle 600. As such, the first replicated PCR pulse 630 is lagging behind the second initial PCR pulse 662 by 1 unit sub-pulse width $T_S$. By augmenting the adjustable time delay $T_{DA}$, the radar sensor 100 attempts to detect other targets which are not yet correlated during the first detection cycle 500.

Because of the small increment of 1 unit sub-pulse width $T_S$, the radar sensor 100 is able to adjust the detection range by a slight margin. This slight adjustment allows the radar sensor 100 to seek out one or more undiscovered targets that may be positioned within the close proximity of the detected targets (e.g., the target that is associated with the fourth received PCR pulse 548 during the first detection cycle 500).

Because of the timing and the reception sequence of the received PCR pulses (e.g., the first, second, third, and fourth received PCR pulses 642, 644, 646, and 648), only the fourth replicated PCR pulse 633 establishes a correlation 601 with the second received PCR pulse 644. As a result of the correlation 601, the analog correlation signal 117 has an autocorrelation magnitude 617 when the received PCR signal 145 is multiplied with the fourth replicated PCR pulse 633.

Meanwhile, the analog correlation signal 117 has a substantially zero magnitude when the received PCR signal 145 is multiplied with the other replicated PCR pulses (e.g., the first replicated PCR pulse 630, the second replicated PCR pulse 631, the third replicated PCR pulse 632, the fifth replicated PCR pulse 634, the sixth replicated PCR pulse 635, the seventh replicated PCR pulse 636, the eighth replicated PCR pulse 637, the ninth replicated PCR pulse 638, and the tenth replicated PCR pulse 639).

The analog correlation signal 117 is sampled and/or digitized at a rate that is substantially synchronized with the replication rate signal 125. In one implementation, for example, the analog correlation signal 117 may be sampled and/or digitized at the rising edge of each of the sampling pulses (e.g., the first sampling pulse 620, the second sampling pulse 621, the third sampling pulse 622, the fourth sampling pulse 623, the fifth sampling pulse 624, the sixth sampling pulse 625, the seventh sampling pulse 626, the eighth sampling pulse 627, the ninth sampling pulse 628, and the tenth sampling pulse 629). In another implementation, for example, the analog correlation signal 117 may be sampled and/or digitized at the falling edge of each of the sampling pulses. In yet another embodiment, for example, the analog correlation signal 117 may be sampled and/or digitized during each of the sampling pulses.

After the analog correlation signal 117 is sampled and/or digitized, the position detection scheme detects a target at or around the fourth sampling pulse 623. The position detection scheme further determines that the detected target has a time of flight substantially equals the sum of 1 unit sub-pulse width $T_S$ and 3 pulse widths $T_P$. Finally, the position detection scheme derives and/or calculates the position of the target based on the determined time of flight of the detected target.

Figure 7:
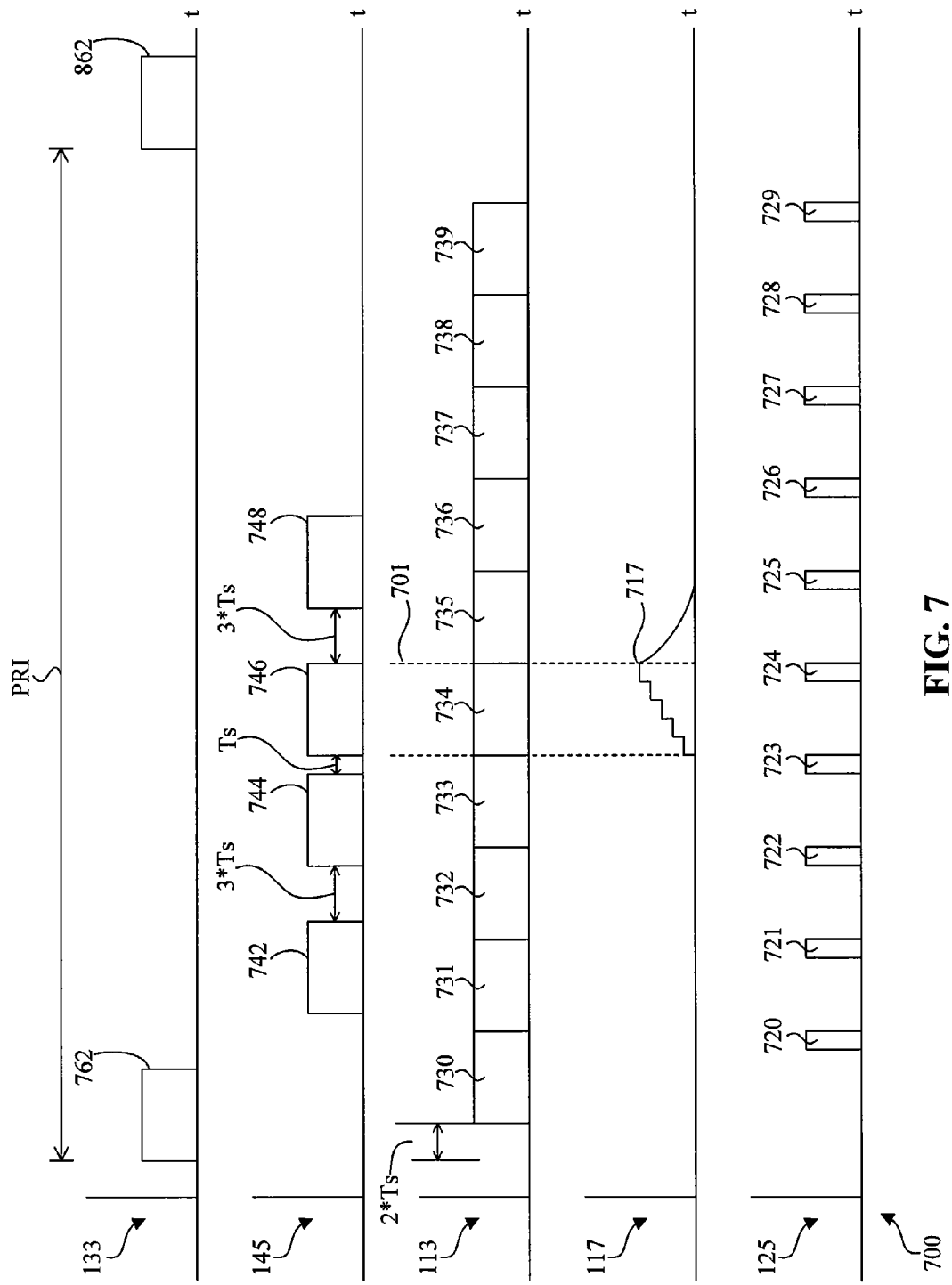
FIG. 7 shows various waveform diagrams of various signals during a third detection cycle according to the first embodiment of the present invention.

FIG. 7 shows the position detection scheme during a third detection cycle 700. The third detection cycle 700 involves the same signals as the first detection cycle 500 and the second detection cycle 600. Transitioning from the second detection cycle 600 to the third detection cycle 700, a third initial PCR pulse 762 is generated in the initial PCR signal 133. After the third initial PCR pulse 762 is generated, the initial PCR signal 133 will be modulated and transmitted.

Assuming that the previously presented targets remain stationary, these targets reflect the transmitted PCR signal 162 again during the third detection cycle 700. As such, the received PCR signal 145 includes the first received PCR pulse 742, the second received PCR pulse 744, the third received PCR pulse 746, and the fourth received PCR pulse 748. Each of these received PCR pulses has a similar temporal relationship with one another as in the second detection cycle 600 because the relative distances of the four reflecting targets remain unchanged.

Thus, there are a first temporal separation of 3 unit sub-pulse width $T_S$ between the first received PCR pulse 742 and the second received PCR pulse 744, a second temporal separation of 1 unit sub-pulse width $T_S$ between the second received PCR pulse 744 and the third received PCR pulse 746, and a third temporal separation of 3 unit sub-pulse width $T_S$ between the third received PCR pulse 746 and the fourth received PCR pulse 748. According to this temporal relationship, the target associated with the first received PCR pulse 742 is closest to the radar sensor 100, whereas the target associated with the fourth received PCR pulse 748 is farthest away from the radar sensor 100.

After the second detection cycle 600, the adjustable time delay $T_{DA}$ will be augmented from 1 unit sub-pulse width $T_S$ to 2 unit sub-pulse widths $T_S$ during the third detection cycle 700. As such, the first replicated PCR pulse 730 is lagging behind the third initial PCR pulse 762 by 2 unit sub-pulse widths $T_S$. By augmenting the adjustable time delay $T_{DA}$, the radar sensor 100 attempts to detect other targets which are not yet correlated during the first detection cycle 500 and the second detection cycle 600.

Because of the small increment of 1 unit sub-pulse width $T_S$, the radar sensor 100 is able to adjust the detection range by a slight margin. This slight adjustment allows the radar sensor 100 to seek out one or more undiscovered targets that may be positioned within the close proximity of the detected targets (e.g., the target that is associated with the fourth received PCR pulse 548 during the first detection cycle 500 and the target that is associated with the second received PCR pulse 644 during the second detection cycle 600).

Because of the timing and the reception sequence of the received PCR pulses (e.g., the first, second, third, and fourth received PCR pulses 742, 744, 746, and 748), only the fifth replicated PCR pulse 734 establishes a correlation 701 with the third received PCR pulse 746. As a result of the correlation 701, the analog correlation signal 117 has an autocorrelation magnitude 717 when the received PCR signal 145 is multiplied with the fifth replicated PCR pulse 734.

Meanwhile, the analog correlation signal 117 has a substantially zero magnitude when the received PCR signal 145 is multiplied with the other replicated PCR pulses (e.g., the first replicated PCR pulse 730, the second replicated PCR pulse 731, the third replicated PCR pulse 732, the fourth replicated PCR pulse 733, the sixth replicated PCR pulse 735, the seventh replicated PCR pulse 736, the eighth replicated PCR pulse 737, the ninth replicated PCR pulse 738, and the tenth replicated PCR pulse 739).

The analog correlation signal 117 is sampled and/or digitized at a rate that is substantially synchronized with the replication rate signal 125. In one implementation, for example, the analog correlation signal 117 may be sampled and/or digitized at the rising edge of each of the sampling pulses (e.g., the first sampling pulse 720, the second sampling pulse 721, the third sampling pulse 722, the fourth sampling pulse 723, the fifth sampling pulse 724, the sixth sampling pulse 725, the seventh sampling pulse 726, the eighth sampling pulse 727, the ninth sampling pulse 728, and the tenth sampling pulse 729). In another implementation, for example, the analog correlation signal 117 may be sampled and/or digitized at the falling edge of each of the sampling pulses. In yet another implementation, for example, the analog correlation signal 117 may be sampled and/or digitized during each of the sampling pulses.

After the analog correlation signal 117 is sampled and/or digitized, the position detection scheme detects a target at or around the fifth sampling pulse 724. The position detection scheme further determines that the detected target has a time of flight substantially equal to the sum of 2 unit sub-pulse widths $T_S$ and 4 pulse widths $T_P$. Finally, the position detection scheme derives and/or calculates the position of the target based on the determined time of flight of the detected target.

Figure 8:
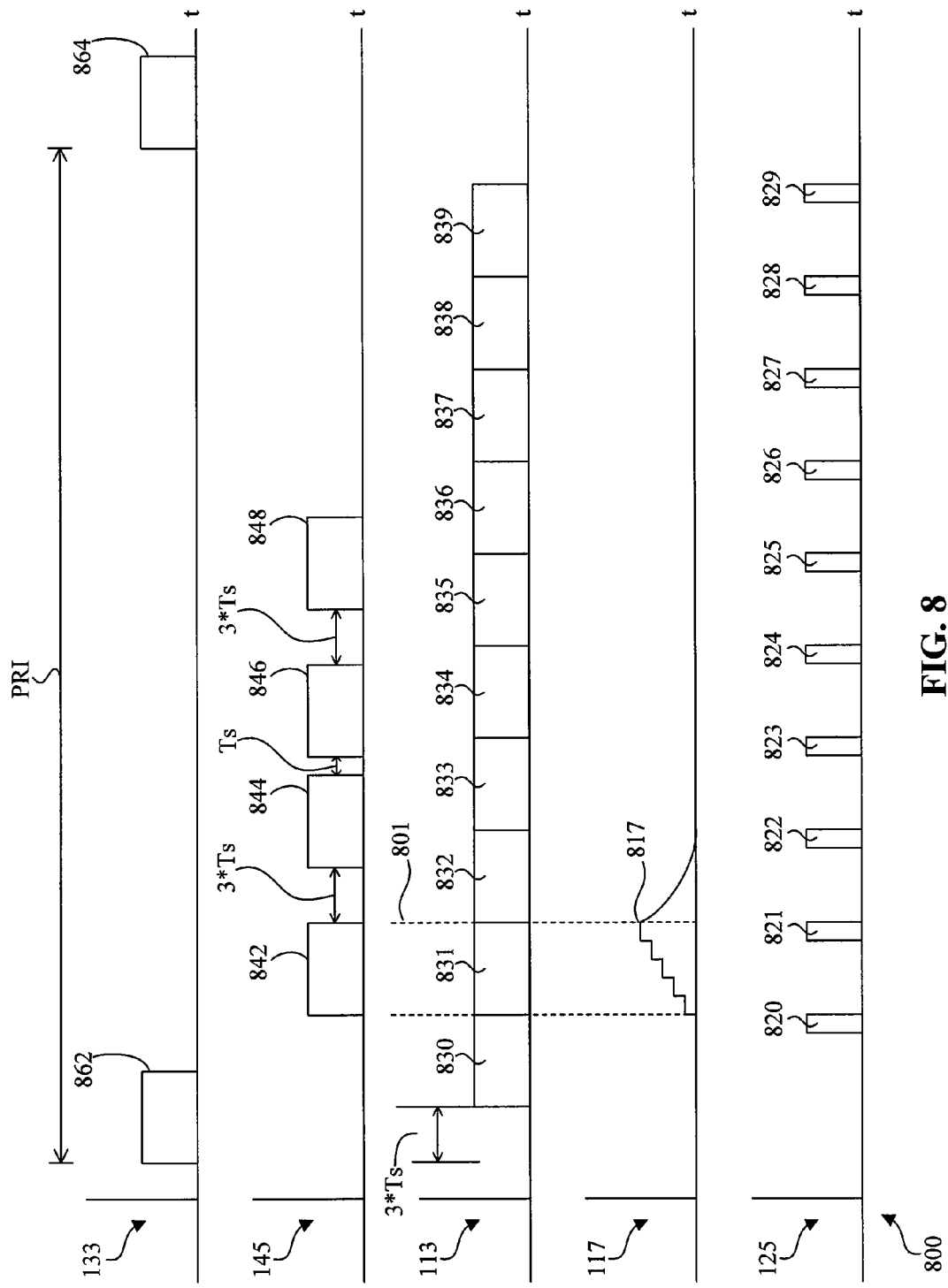
FIG. 8 shows various waveform diagrams of various signals during a fourth detection cycle according to the first embodiment of the present invention.

FIG. 8 shows the position detection scheme during a fourth detection cycle 800. The fourth detection cycle 800 involves the same signals as the first detection cycle 500, the second detection cycle 600, and the third detection cycle 700. Transitioning from the third detection cycle 700 to the fourth detection cycle 800, a fourth initial PCR pulse 862 is generated in the initial PCR signal 133. After the fourth initial PCR pulse 862 is generated, the initial PCR signal 133 will be modulated and transmitted.

Assuming that the previously presented targets remain stationary, these targets reflect the transmitted PCR signal 162 again during the fourth detection cycle 800. As such, the received PCR signal 145 includes the first received PCR pulse 842, the second received PCR pulse 844, the third received PCR pulse 846, and the fourth received PCR pulse 848. Each of these received PCR pulses has a similar temporal relationship with one another as in the third detection cycle 700 because the relative distances of the four reflecting targets remain unchanged.

Thus, there is a first temporal separation of 3 unit sub-pulse width TS between the first received PCR pulse 842 and the second received PCR pulse 844, a second temporal separation of 1 unit sub-pulse width TS between the second received PCR pulse 844 and the third received PCR pulse 846, and a third temporal separation of 3 unit sub-pulse width TS between the third received PCR pulse 846 and the fourth received PCR pulse 848. According to this temporal relationship, the target associated with the first received PCR pulse 842 is closest to the radar sensor 100, whereas the target associated with the fourth received PCR pulse 848 is farthest away from the radar sensor 100.

After the third detection cycle 700, the adjustable time delay $T_{DA}$ will be augmented from 2 unit sub-pulse widths $T_S$ to 3 unit sub-pulse widths $T_S$ during the fourth detection cycle 800. As such, the first replicated PCR pulse 630 is lagging behind the fourth initial PCR pulse 862 by 3 unit sub-pulse widths $T_S$. By augmenting the adjustable time delay $T_{DA}$, the radar sensor 100 attempts to detect other targets which are not yet correlated during the first detection cycle 500, the second detection cycle 600, and the third detection cycle 700.

Because of the small increment of 1 unit sub-pulse width $T_S$, the radar sensor 100 is able to adjust the detection range by a slight margin. This slight adjustment allows the radar sensor 100 to seek out one or more undiscovered targets that may be positioned within the close proximity of the detected targets (e.g., the target that is associated with the fourth received PCR pulse 548 during the first detection cycle 500, the target that is associated with the second received PCR pulse 644 during the second detection cycle 600, and the target that is associated with the third received PCR pulse 746 during the third detection cycle 700).

Because of the timing and the reception sequence of the received PCR pulses (e.g., the first, second, third, and fourth received PCR pulses 842, 844, 846, and 848), only the second replicated PCR pulse 831 establishes a correlation 801 with the first received PCR pulse 842. As a result of the correlation 801, the analog correlation signal 117 has an autocorrelation magnitude 817 when the received PCR signal 145 is multiplied with the second replicated PCR pulse 831. Meanwhile, the analog correlation signal 117 has a substantially zero magnitude when the received PCR signal 145 is multiplied with the other replicated PCR pulses (e.g., the first replicated PCR pulse 830, the third replicated PCR pulse 832, the fourth replicated PCR pulse 833, the fifth replicated PCR pulse 834, the sixth replicated PCR pulse 835, the seventh replicated PCR pulse 836, the eighth replicated PCR pulse 837, the ninth replicated PCR pulse 838, and the tenth replicated PCR pulse 839).

The analog correlation signal 117 is sampled and/or digitized at a rate that is substantially synchronized with the replication rate signal 125. In one implementation, for example, the analog correlation signal 117 may be sampled and/or digitized at the rising edge of each of the sampling pulses (e.g., the first sampling pulse 820, the second sampling pulse 821, the third sampling pulse 822, the fourth sampling pulse 823, the fifth sampling pulse 824, the sixth sampling pulse 825, the seventh sampling pulse 826, the eighth sampling pulse 827, the ninth sampling pulse 828, and the tenth sampling pulse 829). In another implementation, for example, the analog correlation signal 117 may be sampled and/or digitized at the falling edge of each of the sampling pulses. In yet another implementation, for example, the analog correlation signal 117 may be sampled and/or digitized during each of the sampling pulses.

After the analog correlation signal 117 is sampled and/or digitized, the position detection scheme detects a target at or around the second sampling pulse 821. The position detection scheme further determines that the detected target has a time of flight substantially equal to the sum of 3 unit sub-pulse widths $T_S$ and 1 pulse widths $T_P$. Finally, the position detection scheme derives and/or calculates the position of the target based on the determined time of flight of the detected target.

Although four detection cycles are shown in FIGS. 5-8, the position detection scheme may have fewer or more detection cycles according to various embodiments of the present invention. If M is the ratio of the pulse repetition interval PRI over the PCR pulse width $T_P$, then the total number of correlations that can occur within a detection cycle may be less than or equal to M. Moreover, if N is the ratio of the PCR pulse width $T_P$ over the unit sub-pulse width $T_S$, then the total number of detection cycles may be less than or equal to N. Therefore, the total number of correlations $C_{Total}$ (or the maximum number of detectable positions) may be equal to the product of M and N.

In other words, the total number of correlations $C_{Total}$ can essentially be defined by a ratio of the pulse repetition interval PRI over the unit sub-pulse width $T_S$. As long as the pulse repetition remains relatively large in comparison to the unit sub-pulse width $T_S$, the position detection scheme can achieve a wide detection range and a high resolution concurrently. Meanwhile, the position detection scheme spreads the number of total correlations $C_{Total}$ over several detection cycles and over several replicated PCR pulses within each detection cycle. Such spreading can improve the performance of the detection process by incorporating multiple correlations within one detection cycle. Moreover, such spreading can reduce the overall power consumption by reducing the sampling rate of the analog-to-digital converter 118. By adopting a high PRI-to-$T_S$ ratio and by correlation spreading, the radar sensor 100 achieves the advantages of high resolution, wide detection range and robust performance while limiting the power consumption of the detection process.

The discussion now turns to various circuit architectures for implementing the functional features of the radar sensor 100. As discussed herein, the following circuit architectures, and the position detection schemes executed thereby, further expand the spirit and purpose of the radar sensor 100 and of the position detection scheme as discussed in FIGS. 1-8.

Therefore, the following circuit architectures, and the position detection schemes executed thereby, should not be construed to limit the scope of the radar sensor 100 and the position detection scheme as discussed in FIGS. 1-8.

Figure 9:
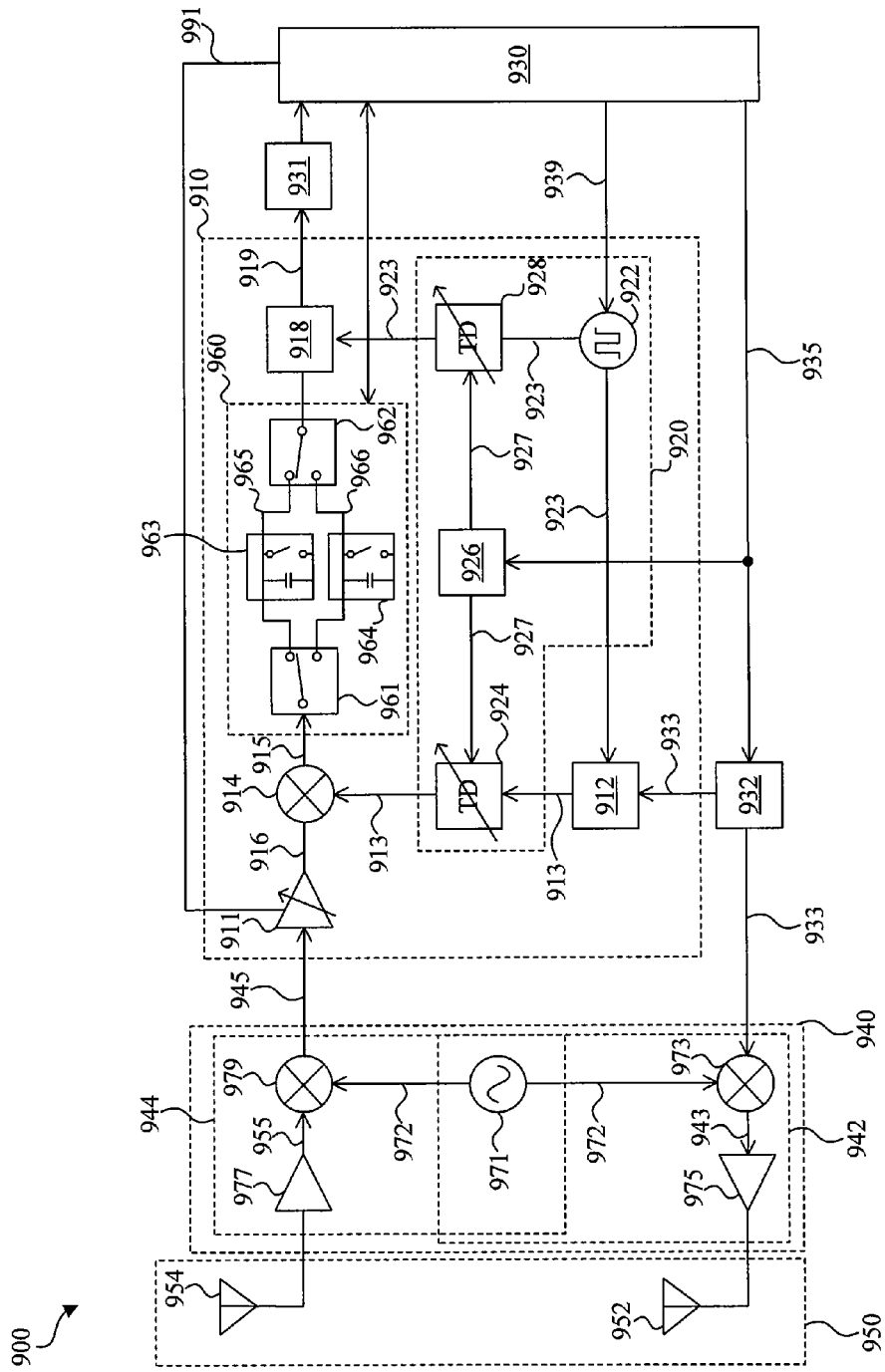
FIG. 9 shows a schematic view of a radar sensor according to a second embodiment of the present invention.

FIG. 9 shows a schematic view of a radar sensor 900 according to a second embodiment of the present invention. The radar sensor 900 can be incorporated in a radar system. The radar sensor 900 includes a PCR signal generator 932, an analog correlator module 910, a detection controller 930, an RF front end module 940, and an antenna module 950. The analog correlator module 910 communicates and cooperates with the detection controller 930 in detecting the positions of one or more targets. From a high level stand point, the analog correlator module 910 performs similar functions as the analog correlator 110, while the detection controller 930 performs similar functions as the detection controller 130.

At the beginning of a detection cycle, the detection controller 930 generates a detection cycle signal 935, which causes the PCR signal generator 932 to generate an initial PCR signal 933. The initial PCR signal 933 includes a PCR pulse having a PCR pulse width $T_P$ and a compressed code sequence. The compressed code sequence includes a plurality of bits, each of which can be represented by a sub-pulse that has a unit sub-pulse width $T_S$. Generally, the PCR pulse width $T_P$ is a numeric multiple of the unit sub-pulse width $T_S$ such that the PCR pulse width $T_P$ can be expressed as $N*T_S$, where N is the number of bits represented by the PCR pulse.

The initial PCR signal 933 is fed into a transmission path and a replication path. Along the transmission path, the initial PCR signal 933 is frequency modulated by an RF modulator 942 according to one or more frequency modulation schemes, such as phase-shift keying (PSK), binary phase-shift keying (BPSK), frequency-shift keying (FSK), and/or amplitude-shift keying (ASK). The RF modulator 942 may an integral part of the RF front end module 940, which may also include the RF demodulator 944.

In one implementation, the RF modulator 942 may include a frequency modulated (FM) carrier generator 971, a modulation mixer (upconverter) 973 and a transmission amplifier 975. The FM carrier generator 971 is be used for generating a FM carrier signal 972. The modulation mixer 973 combines the initial PCR signal 933 with the carrier signal 972 according to one or more modulation schemes. As a result of such combination, the modulation mixer 973 converts the initial PCR signal 933, which can be a baseband signal, to an outbound RF modulation signal 943. The transmission amplifier 975 prepares the outbound RF modulation signal 943 for transmission. Particularly, the transmission amplifier 975 amplifies the amplitude of the outbound RF modulation signal 943 before it is transmitted by the transmitting antenna 952.

The transmitted PCR signal (i.e., the outbound RF modulation signal 943 transmitted by the transmitting antenna 952) may be reflected by one or more targets. As a result of the reflections, one or more reflected PCR signals propagate back to, and eventually are received by the receiving antenna 954. The RF demodulator 944 demodulates the reflected PCR signals for extracting one or more reflected PCR pulses. The RF demodulator 944 includes a reception amplifier 977 and a demodulation filter (downconverter) 979, and it may share the FM carrier generator 971 with the RF modulator 942. Alternatively, the RF modulator 944 may have an individual FM carrier generator separated from the RF modulator 942 according to an alternative embodiment of the present invention.

The reception amplifier 977 amplifies the reflected PCR signals before they are demodulated. The demodulation filter 979 applies the FM carrier signal 972 in removing the carrier frequency from the reflected PCR signals. Reversing the original modulation scheme, the demodulation filter 979 decodes the baseband messages of the reflected PCR signals. These baseband messages may include a plurality of received PCR pulses, each of which is associated with a detectable target. As a result of the filtering and decoding, the demodulation filter 979 converts the reflected PCR signals to a received PCR signal 945, which includes the plurality of received PCR pulses.

Along the replication path, the initial PCR signal 933 is replicated and correlated by the analog correlator module 910. The analog correlator module 910 includes a variable gain amplifier (VGA) 911, a replica generator 912, a multiplier 914, an analog-to-digital amplifier (ADC) 918, and a timing module 920. The timing module 920 performs similar functions as the timing module 120. For example, the timing module 920 may be used for controlling the replication rate of the initial PCR pulse and the sampling rate of the ADC 918.

More specifically, the timing module 920 includes a sampling clock generator 922, a first variable time delay component (VTDC) 924, a second variable time delay component (VTDC) 928, and a timing controller 926. The sampling clock generator 922 is coupled to the detection controller 930 for receiving a sampling control signal 939. The sampling control signal 939 is embedded with information related to the PCR pulse width TP, which is used for adjusting the rate at which the initial PCR pulse is being replicated. In return, the sampling clock generator 922 generates a sampling signal 923 based on information embedded in the sampling control signal 939.

The replica generator 912 is coupled to the sampling clock generator 922 for receiving the sampling signal 923. Driven by the sampling rate of the sampling signal 923, the replica generator 912 generates a template signal 913. The template signal 913 replicates the initial PCR pulse of the initial PCR signal 933 as it is being generated. As such, the first replicated PCR pulse of the template signal 913 is synchronized with the initial PCR pulse of the initial PCR signal 933. The subsequent replicated PCR pulses in the template signal 913 lag behind the initial PCR pulse by a multiple of the PCR pulse width $T_P$. For example, the second replicated PCR pulse is one PCR pulse width $T_P$ behind the initial PCR pulse, and the third replicated PCR pulse is two PCR pulse widths $T_P$ behind the initial PCR pulse.

The template signal 913 is time-shifted by the first VTDC 924. The first VTDC 924 includes various time delay elements, which is selectively enabled by a delay adjustment signal 927. The timing controller 926 includes a register for counting the number of detection cycle signals 935. The register will be reset at the end of each pulse repetition interval PRI. Based on the value stored in the register, the timing controller 926 determines the number of completed detection cycles. The timing controller 926 generates the delay adjustment signal 927 based on the number of completed detection cycles.

In one implementation, the delay adjustment signal 927 may activate one time delay element for imposing a time delay of 1 unit sub-pulse width $T_S$ when one detection cycle is completed. In another implementation, the delay adjustment signal 927 may activate two time delay elements for imposing a time delay of 2 unit sub-pulse widths $T_S$ when two detection cycle is completed. In yet another implementation, the delay adjustment signal 927 may activate n time delay elements for imposing a time delay of n unit sub-pulse widths $T_S$ when n detection cycle is completed.

As a result of the time-shifting, the replicated PCR pulses of the template signal 913 have a replication rate. The replication rate is substantially the same as the sampling rate, and it lags behind the initial PCR signal 933 by the adjustable time delay $T_{D4}$. The current implementation of the adjustable time delay $T_{D4}$ is slightly different from the one as discussed in FIG. 2 because the time-shifting of the current implementation is performed after the template signal 913 is generated. However, both implementations can achieve the same result, which is to provide a time-delayed and replicated version of the initial PCR pulse for correlating with the received PCR signal 945, or alternatively, with the amplified PCR signal 916 when the VGA 911 is deployed.

The second VTDC 928 is coupled to the sampling clock generator 922, so that it is used for time-shifting the sampling signal 923. The second VTDC 928 includes various time delay elements, which is selectively enabled by a delay adjustment signal 927. Accordingly, the timing controller 926 can control the second VTDC 928 in a manner similar to the control of the first VTDC 924. In one implementation, the delay adjustment signal 927 may activate one time delay element for imposing a time delay of 1 unit sub-pulse width $T_S$ when one detection cycle is completed. In another implementation, the delay adjustment signal 927 may activate two time delay elements for imposing a time delay of 2 unit sub-pulse widths $T_S$ when two detection cycle is completed. In yet another implementation, the delay adjustment signal 927 may activate n time delay elements for imposing a time delay of n unit sub-pulse widths $T_S$ when n detection cycle is completed.

Under some circumstances, the sampling signal 923 may have different parasitic effects than the template signal 913. Such a difference may create an asymmetric time-shifting between the sampling signal 923 and the template signal 913 when the time delay elements of the first VTDC 924 share the same time delay properties with the time delay elements of the second VTDC 928. In order to eliminate or minimize the asymmetric time-shifting, the various time delay elements include different time delay properties than those of the first VTDC 924 for compensating the difference in parasitic effects. Driven by the time delayed sampling signal 923, the ADC 918 samples and/or digitizes the output of the integrator module 960 at a rate that is substantially synchronized with the replication rate of the template signal 913.

The integrator module 960 may adopt an alternate scheme (a.k.a. alternate architecture) in generating one or more analog correlation signals. The integrator module 960 may include a bank of individual integrators, such as a first integrator 963 and a second integrator 964. Each of the first integrator 963 and the second integrator 964 includes a charge storage component, such as a capacitor, and a switchable discharge path. Under the alternate scheme, the first integrator 963 is responsible for generating a first analog correlation signal 965 during a first set of replicated PCR pulses, while the second integrator 964 is responsible for generating a second analog correlation signal 966 during a second set of replicated PCR pulses.

When the first set of replicated PCR pulses interposes with the second set of replicated PCR pulses to form an alternate pattern, the first integrator 963 and the second integrator 964 can be charged and discharged in an alternate sequence. The integrator module 910 includes an input switch 961 and an output switch 962 to actuate the alternate sequence. The input switch 961 can be controlled by the sampling signal 923. According to the sampling rate of the sampling signal 923, the input switch 961 is selectively couple to the first integrator 963 and the second integrator 964 to the multiplier 914.

Because the sampling rate of the sampling signal 923 is substantially synchronized with the replication rate, the coupling and decoupling between the input switch 961 and the first and second integrators 963 and 964 are also synchronized with the replication rate. As such, the first integrator 963 and the second integrator 964 take turns receiving the multiplied signal 915 from the multiplier 914 as successive replicated PCR pulses are being multiplied with the received PCR signal 945, or alternatively, with the amplified PCR signal 916 when the VGA 911 is deployed.

Similarly, the output switch 962 can be controlled by the sampling signal 923. According to the sampling rate of the sampling signal 923, the output switch 962 selectively couples the first integrator 963 and the second integrator 964 to the ADC 918. Because the sampling rate of the sampling signal 923 is substantially synchronized with the replication rate, the coupling and decoupling between the output switch 962 and the first and second integrators 963 and 964 are also synchronized with the replication rate. As such, the first integrator 963 and the second integrator 964 take turns delivering the first and second analog correlation signals 965 and 966 to the ADC 918 as successive sampling pulses are being sent to the ADC 918.

The ADC 918 samples and/or digitizes the first analog correlation signal 965 and the second analog correlation signal 966 according to the same alternate sequence. As a result, the ADC 918 generates a digital signal 919, which incorporates the autocorrelation magnitudes of both the first and second analog correlation signals 965 and 966. The digital signal 919 is sent to the detection controller 930. Optionally, the digital signal 919 may be further processed by a process gain stage 931 before being sent to the detection controller 930.

This alternate scheme is beneficial for detecting a group of targets that are positioned adjacent to one another. Mainly, the group of closely positioned targets may reflect a series of reflect PCR pulses, each of which may have a small temporal separation with one another. If the accumulated charges from a previous multiplying are not released in time, the autocorrelation magnitude of the analog correlation signal may be distorted for the current multiplying. The alternate scheme allows one integrator to release the accumulated charges during an entire PCR pulse width TP while the other integrator is generating the analog correlation signal. As such, the first analog correlation signal 965 and the second analog correlation signal 966 may be substantially free from distortion.

Figure 10:
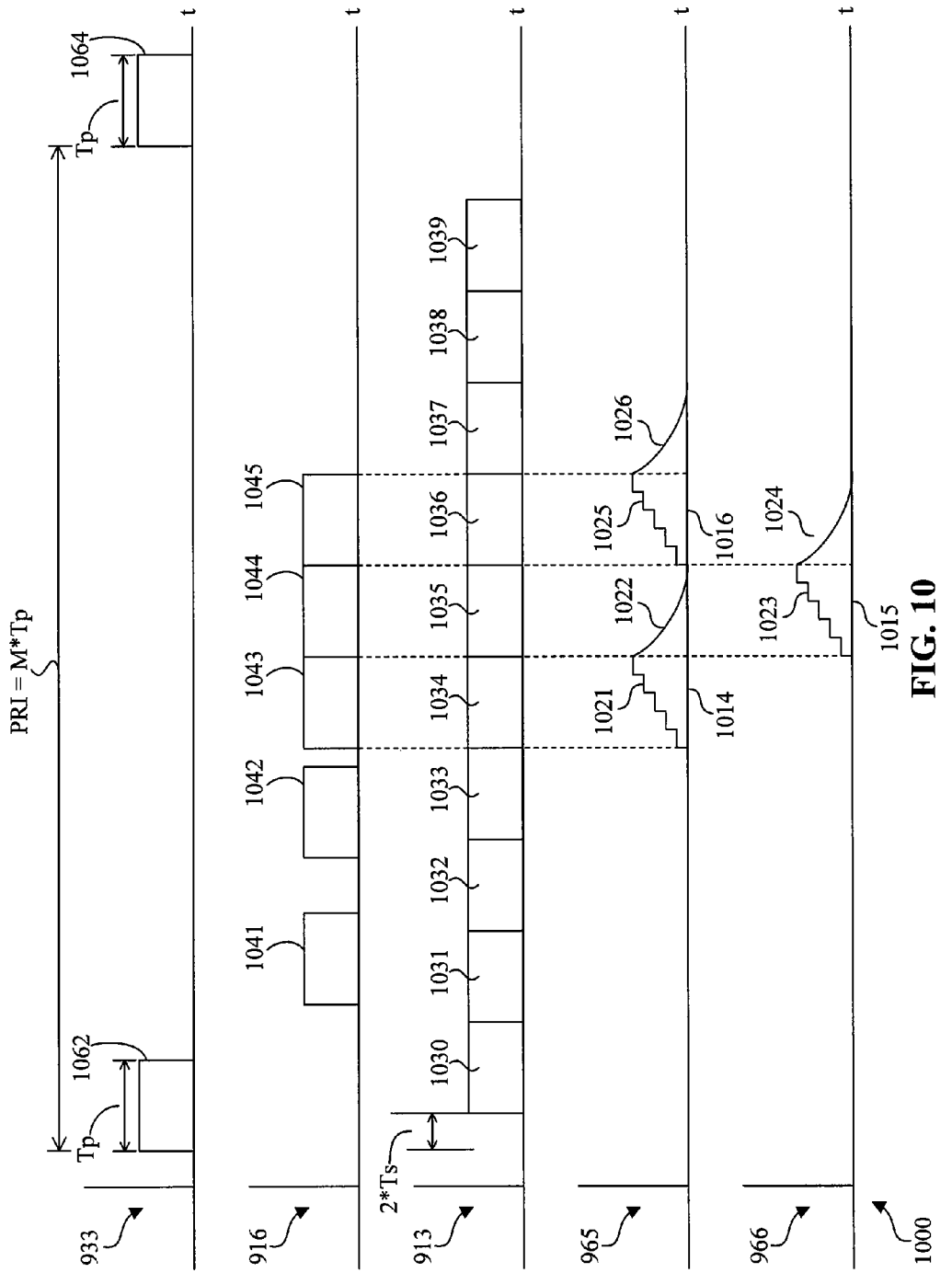
FIG. 10 shows various waveform diagrams of various signals in a multiple-correlation scenario according to the second embodiment of the present invention.

FIG. 10 shows a multiple-correlation scenario 1000 in which the alternate scheme is used for avoiding potential distortion of the first analog correlation signal 965 and the second analog correlation signal 966. The multiple-correlation scenario 1000 can be initiated by a first initial PCR pulse 1062 in the initial PCR signal 933. After the first initial PCR pulse 1062 is generated, the initial PCR signal 933 will be modulated and transmitted.

The transmitted PCR signal may be reflected by five separately positioned targets. For example, a first target is associated with a first amplified PCR pulse 1041, a second target is associated with a second amplified PCR pulse 1042, a third target is associated with a third amplified PCR pulse 1043, a fourth target is associated with a fourth amplified PCR pulse 1044, and a fifth target is associated with a fifth amplified PCR pulse 1045. As such, the amplified PCR signal 916 includes the first amplified PCR pulse 1041, the second amplified PCR pulse 1042, the third amplified PCR pulse 1043, the fourth amplified PCR pulse 1044, and the fifth amplified PCR pulse 1045.

The first amplified PCR pulse 1041 leads the second amplified PCR pulse 1042 by 3 unit sub-pulse width $T_S$ plus 1 PCR pulse width $T_P$. The second amplified PCR pulse 1042 leads the third amplified PCR pulse 1043 by 1 unit sub-pulse width $T_S$ plus 1 PCR pulse width $T_P$. The third amplified PCR pulse 1043 leads the fourth amplified PCR pulse 1044 by only 1 PCR pulse width $T_P$, and the fourth amplified PCR pulse 1044 leads the fifth amplified PCR pulse 1045 by only 1 PCR pulse width $T_P$.

According to this reception sequence, the first target associated with the first amplified PCR pulse 1041 is closest to the radar sensor 100, whereas the fifth target associated with the fifth amplified PCR pulse 1045 is farthest away from the radar sensor 100. Moreover, based on the proximity in time at which the third, fourth, and fifth amplified PCR pulses 1043, 1044, and 1045 are generated, the third, fourth, and fifth targets are positioned adjacent to one another. Furthermore, because the third, fourth, and fifth amplified PCR pulses 1043, 1044, and 1045 are consecutive pulses, meaning that there is no temporal spacing in between these pulses, they can all be correlated with three consecutive replicated PCR pulses during one single detection cycle.

During the single detection cycle, for example, the adjustable time delay $T_{DA}$ of the template signal 913 substantially equals about 3 unit sub-pulse widths $T_S$. Among the ten replicated pulses, the fifth replicated PCR pulse 1034 is correlated with the third amplified PCR pulse 1043, the sixth replicated PCR pulse 1035 is correlated with the fourth amplified PCR pulse 1044, and the seventh replicated PCR pulse 1036 is correlated with the fifth amplified PCR pulse 1045. As a result of these correlations, the multiplier 914 delivers a stream of positive charges during a period that covers the fifth, sixth, and seventh replicated PCR pulses 1034, 1035, and 1036.

Under the alternate scheme, the first integrator 963 and the second integrator 964 are turned on alternately between successive replicated PCR pulses. The first integrator 963 and the second integrator 964 are activated and/or deactivated by the input switch 961 and the time-shifted sampling signal 923. As discussed herein, an integrator accumulates charges delivered by the multiplied signal 915 while it is activated, and the integrator releases the accumulated charges while it is deactivated. More specifically, the switchable discharge path of each of the first integrator 963 and the second integrator 964 may be opened and/or closed by the time shifted sampling signal 923. As such, the switchable discharge path is open and non-conducting when the respective integrator is activated, and it is closed and conducting when the respective integrator is deactivated.

In one implementation, for example, the first integrator 963 may be activated during the odd number replicated PCR pulses (e.g., the first, third, fifth, seventh, and ninth replicated PCR pulses 1030, 1032, 1034, 1036, and 1038), while second integrator 694 may be activated during the even number replicated PCR pulses (e.g., the second, fourth, sixth, eighth, and tenth replicated PCR pulses 1031, 1033, 1035, 1037, and 1039). In an alternative implementation, for example, the first integrator 963 may be activated during the even number replicated PCR pulses (e.g., the second, fourth, sixth, eighth, and tenth replicated PCR pulses 1031, 1033, 1035, 1037, and 1039), while second integrator 694 may be activated during the odd number replicated PCR pulses (e.g., the first, third, fifth, seventh, and ninth replicated PCR pulses 1030, 1032, 1034, 1036, and 1038).

When the first integrator 963 is configured to be activated during the odd replicated PCR pulses, the first analog correlation signal 965 has a first autocorrelation magnitude 1014 during the fifth replicated PCR pulse 1034. Before being sampled by the ADC 918, the first autocorrelation magnitude 1014 has a first charging edge 1021 during the fifth replicated PCR pulse 1034.

When the sixth replicated PCR pulse 1035 is correlated with the fourth amplified PCR pulse 1044, the first integrator 963 is deactivated while the second integrator 964 is activated. As a result of the activation, the second analog correlation signal 966 has a second autocorrelation magnitude 1015 during the sixth replicated PCR pulse 1035. Moreover, during the fifth replicated PCR pulse 1034, the second autocorrelation magnitude 1015 has a second discharging edge 1024 before being sampled by the ADC 918. While the second integrator 964 is accumulating charge, the first integrator 963 has a PCR pulse width $T_P$ of time to release the accumulated charge during the sixth replicated PCR pulse 1035. Consequently, the first autocorrelation magnitude 1014 has a first discharging edge 1022.

When the seventh replicated PCR pulse 1036 is correlated with the fifth amplified PCR pulse 1045, the first integrator 963 is activated again while the second integrator 964 is deactivated. As a result of the activation, the first analog correlation signal 965 has a third autocorrelation magnitude 1016 and a third charging edge 1025 during the seventh replicated PCR pulse 1036. Because the first integrator 963 has sufficient time to discharge the previously accumulated charge, the first analog correlation signal 965 is substantially free from distortion caused by the previous correlation. Advantageously, the subsequent third autocorrelation magnitude 1016 can accurately represent the correlation between the replicated PCR pulse and the amplified PCR pulse.

While the first integrator 963 is accumulating charge, the second integrator 964 has a PCR pulse width $T_P$ of time to release the accumulated charge during the seventh replicated PCR pulse 1036. Consequently, the second autocorrelation magnitude 1015 has a first discharging edge 1024. After the discharging, the second integrator 964 is ready for accumulating charge again during the next replicated PCR pulse.

Although FIG. 10 shows that the alternate scheme is coordinated by the replicated PCR pulse sequence, the alternate scheme may be coordinated by the detection controller 930 in an alternative embodiment. Initially, the detection controller 930 can activate one of the first integrator 963 or the second integrator 964. When the detection controller 930 detects a target during one of the replicated PCR pulses, the detection controller 930 switches the activation status between the first integrator 963 and the second integrator 964. On the other hand, when no target is detected, the activated integrator is unlikely to accumulate a substantial amount of charges. As such, the activated integrator may take little to no time to discharge, and the detection controller 930 can therefore maintain the activation status between the first integrator 963 and the second integrator 964. Advantageously, this scheme may reduce the switching activity within the integrator module 960 while still allowing the integrators sufficient time for discharging.

The discussion now turns to a compensation scheme (or compensation architecture) for received PCR signal 945. In general, the amplitude level of the received PCR signal 945 is progressively weaker towards the end of a detection cycle. This is due to the fact that the transmitted PCR signal and the reflected PCR signal lose more power (signal attenuation) when they travel for a longer distance. When the amplitude level of the received PCR signal 945 is weak, the signal-to-noise ratio (SNR) associated with the processing of the received PCR signal 945 is typically reduced. As such, the output of the ADC 918 may be more susceptible to distortion caused by background noise.

Referring again to the embodiment as shown in FIG. 9, the variable gain amplifier (VGA) 911 is used for mitigating the problem of signal attenuation and to improve the SNR at the output of the ADC 918. The VGA 911 selectively amplifies the received PCR signal 945. The selective amplification may be based on a waiting period measured from the generation of the initial PCR signal 933. The waiting period is commensurate with the travelling distance of the transmitted PCR signal and the reflected PCR signal. As such, the waiting period can be used for approximating the extent of signal attenuation.

Particularly, the gain of the VGA 911 is increased in a progressive manner as the detection cycle progresses from the beginning to the end. As a result of the selective amplification, the VGA 911 generates the amplified PCR signal 916 to correct and/or compensate the attenuated amplitude of the received PCR signal 945. In one embodiment, the adjustable gain of VGA 911 is controlled by the detection controller 930 via a variable gain control signal 991. In another embodiment, the adjustable gain of the VGA 911 is controlled directly by the timing module 920.

Figure 11:
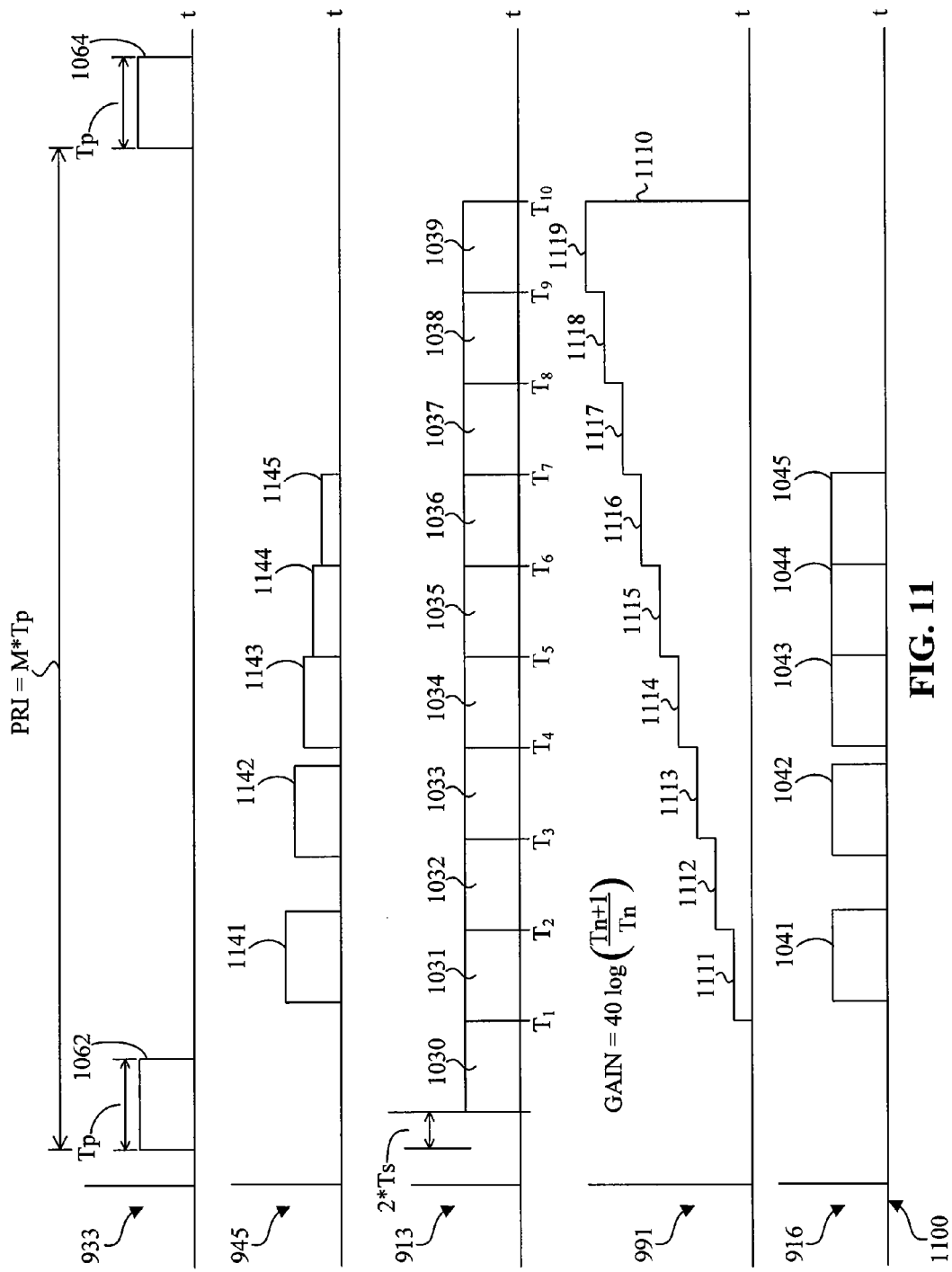
FIG. 11 shows various waveform diagrams of various signals in a dynamic gain control scheme according to the second embodiment of the present invention.

FIG. 11 shows the waveform diagrams of various signals in a dynamic gain control scheme 1100 according to the second embodiment of the present invention. As discussed herein, the dynamic gain control scheme 1100 is a part of the compensation scheme because the dynamic gain control scheme 1100 only represents one of the many implementation options of the compensation scheme. Hence, the dynamic gain control scheme 1100 may elaborate the operational detail of the compensation scheme but without limiting the general concept and scope of the compensation scheme.

The dynamic gain control scheme 1100 may be initiated by the first initial PCR pulse 1062 in the initial PCR signal 933. After the first initial PCR pulse 1062 is generated. The initial PCR signal 933 is modulated and transmitted. The transmitted PCR signal may be reflected by five separately positioned targets. For example, a first target is associated with a first received PCR pulse 1141, a second target is associated with a second received PCR pulse 1142, a third target is associated with a third received PCR pulse 1143, a fourth target is associated with a fourth received PCR pulse 1144, and a fifth target is associated with a fifth received PCR pulse 1145. As such, the received PCR signal 945 includes the first received PCR pulse 1141, the second received PCR pulse 1142, the third received PCR pulse 1143, the fourth received PCR pulse 1144, and the fifth received PCR pulse 1145.

The first received PCR pulse 1141 is received after time $T_1$. The second received PCR pulse 1142 is received after time $T_2$, which is about 1 PCR pulse width $T_P$ later than time $T_1$. The third received PCR pulse 1143 is received at time $T_4$, which is about 3 PCR pulse widths $T_P$ later than time $T_1$. The fourth received PCR pulse 1144 is received at time $T_5$, which is about 4 PCR pulse widths $T_P$ later than time $T_1$. The fifth received PCR pulse 1145 is received at time $T_{56}$, which is about 5 PCR pulse widths $T_P$ later than time $T_1$.

According to this reception sequence, signal strength of the first received PCR pulse 1141 can be the strongest while the signal strength of the fifth received PCR pulse 1145 can be the weakest. The signal strength, which is represented by the amplitude level, of each received PCR pulses may decrease exponentially as the time of reception progresses within the detection cycle. To compensate and/or correct this exponential decrease in signal strength, the variable gain control signal 991 delivers a dynamic gain value 1110 to the VGA 911, so that the VGA 911 can adjust the gain accordingly.

In one implementation, the dynamic gain value 1110 may be updated according to the sampling rate of the time-shifted sampling signal 923. In another implementation, the dynamic gain value 1110 may be a function of the current adjustment time $T_n$ and the previous adjustment time $T_{n-1}$, which can be represented by the following formula:

$$\text{Gain} = 40\log\left(\frac{T_n}{T_{n-1}}\right)$$

According to this formula, the dynamic gain value 1110 may have: a first adjustment gain 1111 during the second replicated PCR pulse 1031; a second adjustment gain 1112 during the third replicated PCR pulse 1032; a third adjustment gain 1113 during the fourth replicated PCR pulse 1033; a fourth adjustment gain 1114 during the fifth replicated PCR pulse 1034; a fifth adjustment gain 1115 during the sixth replicated PCR pulse 1035; a sixth adjustment gain 1116 during the seventh replicated PCR pulse 1036; a seventh adjustment gain 1117 during the eighth replicated PCR pulse 1037; a eighth adjustment gain 1118 during the ninth replicated PCR pulse 1038; and a ninth adjustment gain 1119 during the tenth replicated PCR pulse 1031. When a second initial PCR signal 1064 is generated, which signifies the beginning of a new detection cycle, the dynamic gain value 1110 will be reset to its initial value.

Based on the respective adjustment gain provided by the variable gain control signal 991, the VGA 911 generates the first amplified PCR pulse 1041, the second amplified PCR pulse 1042, the third amplified PCR pulse 1043, the fourth amplified PCR pulse 1044, and the fifth amplified PCR pulse 1045. Because of the dynamic gain control scheme 1100, each of the amplified PCR pulses is restored to a relatively uniform and a relatively high amplitude level. Advantageously, such restoration helps improve the SNR at the output end of the ADC 918.

The discussion now turns to various embodiments for modifying the radar sensor 900 as shown in FIG. 9. These modified embodiments can improve the detection speed of the radar sensor 900, and they can enable the radar sensor 900 for sensing high speed mobile targets. Several components of these modified embodiments are already presented in the radar sensor 900. These components perform substantially the same functions as discussed in FIGS. 9-11. As such, the following discussion will only focus on the newly introduced components.

Figure 12:
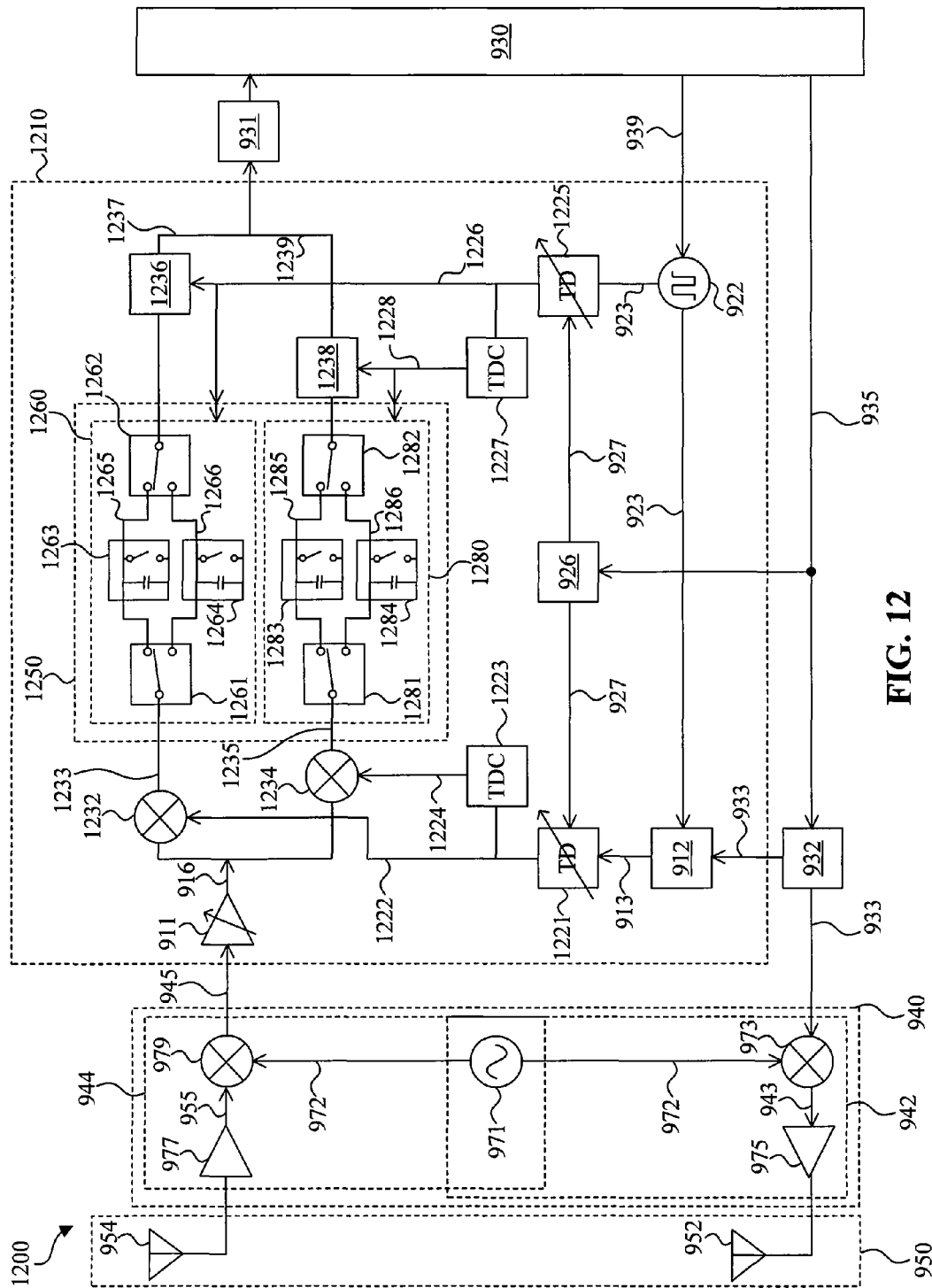
FIG. 12 shows a schematic view of a high speed radar sensor according to a third embodiment of the present invention.

FIG. 12 shows a schematic view of a high speed radar sensor 1200 according to a third embodiment of the present invention. When compared to the radar sensor 900, the high speed radar sensor 1200 includes several modifications. For example, the analog correlator module 910 is replaced by the analog correlator module 1210, which incorporates a parallel architecture for fast target detection. In the parallel architecture, the integrator module 960 is replaced by an integrator bank 1250. The integrator bank 1250 processes multiple correlations at several periods of time, such that the number of detection cycles and the overall detection time is reduced geometrically. The integrator bank 1250 may include two or more parallel integrator modules, such as a first integrator module 1260 and a second integrator module 1280. Each of the first integrator module 1260 and the second integrator module 1280 may include similar structural and functional features as the integrator module 960.

In one embodiment, for example, the first integrator module 1260 includes a first input switch 1261, a first output switch 1262, a first integrator 1263, and a second integrator 1266. The first integrator 1263 and the second integrator 1264 performs similar functions as the first integrator 963 and the second integrator 964 as discussed in FIGS. 9-11. For example, the first integrator 1263 and the second integrator 1264 are used for implementing one or more alternate schemes. As such, the first integrator 1263 generates a first analog correlation signal 1265, and the second integrator 1264 generates a second analog correlation signal 1266.

The first input switch 1261 performs similar functions as the input switch 961. For example, the first input switch 1261 actuates one or more alternate schemes by selectively coupling the first integrator 1263 and the second integrator 1264 to a first multiplier 1232. The first output switch 1262 performs similar functions as the output switch 962. For example, the first output switch 1262 actuates one or more alternate schemes by selectively coupling the first integrator 1263 and the second integrator 1264 to a first analog-to-digital converter (ADC) 1236.

In another implementation, for example, the second integrator module 1280 may include a second input switch 1281, a second output switch 1282, a third integrator 1283, and a second integrator 1286. The second integrator 1283 and the fourth integrator 1284 perform similar functions as the first integrator 963 and the second integrator 964 as discussed in FIGS. 9-11. For example, the third integrator 1283 and the fourth integrator 1284 can be used for implementing one or more alternate schemes. As such, the third integrator 1283 can generate a third analog correlation signal 1285, and the fourth integrator 1284 can generate a fourth analog correlation signal 1286.

The second input switch 1281 performs similar functions as the input switch 961. For example, the second input switch 1281 actuates one or more alternate schemes by selectively coupling the third integrator 1283 and the fourth integrator 1284 to a second multiplier 1234. The second output switch 1282 performs similar functions as the output switch 962. For example, the second output switch 1282 actuates one or more alternate schemes by selectively coupling the third integrator 1283 and the fourth integrator 1284 to a second analog-to-digital converter (ADC) 1238.

To support the parallel architecture, the analog correlator module 1210 includes an additional multiplier, a time delay component, and a template signal. Along the replication path, for example, the analog correlator module 1210 includes a first variable time delay component (VTDC) 1221 and a first constant time delay component (CTDC) 1223. The first VTDC 1221 performs similar functions as the first VTDC 924 discussed in FIG. 9. As such, the first VTDC 1221 can be adjusted by the timing controller 926 and in a manner similar to the first VTDC 924.

The first VTDC 1221 generates a first template signal 1222, which is fed into the first multiplier 1232 and the first CTDC 1223. The first template signal 1222 is multiplied with the amplified PCR signal 916 to generate the first multiplied signal 1233. In return, the first multiplied signal is used for generating the first analog correlation signal 1265 and the second analog correlation signal 1266.

The first CTDC 1223 generates a second template signal 1224 by imposing a constant time delay $T_{DC}$ on the first template signal 1222. As such, the second template signal 1224 is a time-shifted version of the first template signal 1222. The second template signal 1224 is multiplied with the amplified PCR signal 916 at the second multiplier 1234, which generates a second multiplied signal 1235 based on such multiplying. In return, the second multiplied signal 1235 is used for generating the third analog correlation signal 1285 and the fourth analog correlation signal 1286.

Figure 13:
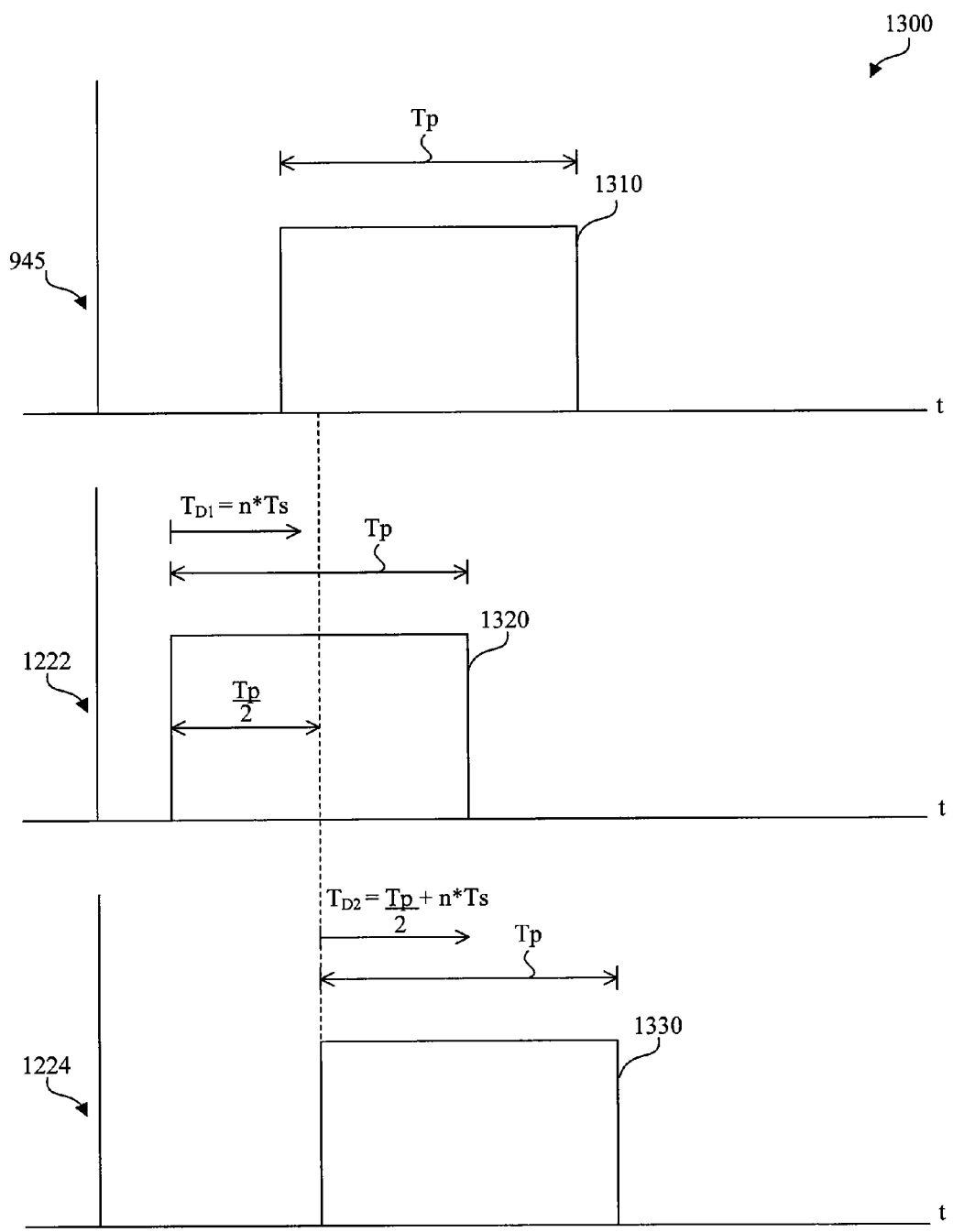
FIG. 13 shows various waveform diagrams of various signals of a fast sensing scheme according to the third embodiment of the present invention.

To further elaborate on the operation of the parallel architecture, FIG. 13 shows the waveform diagrams of various signals from a fast sensing scheme 1300 according to the third embodiment of the present invention. As discussed herein, the fast sensing scheme 1300 represents only one of the many fast sensing schemes which the analog correlator module 1210 can execute. The fast sensing scheme 1300 may be further modified to meet other design goals. As such, the fast sensing scheme 1300 may demonstrate but does not limit the general scope and concept of the analog correlator 1210.

For the sake of simplicity, the fast sensing scheme 1300 is used for detecting a received PCR pulse 1310 (or an amplified PCR pulse if the VGA is deployed), which is a part of the received PCR signal 945. The first template signal 1222 includes a first replicated PCR pulse 1320. As the fast sensing scheme 1300 goes through several detection cycles, the adjustable time delay $T_{D1}$ of the first template signal 1222 substantially equals to $n*T_S$, where n denotes the number of detection cycles after the first detection cycle.

After being time-shifted by the first CTDC 1223, the second template signal 1224 includes a second replicated PCR pulse 1330, which maintains a constant temporal separation with respect to the first replicated PCR pulse 1320. In one implementation, the first CTDC 1223 may impose a constant time delay $T_{DC}$ of a half PCR pulse width $T_P/2$ to the second replicated PCR pulse 1330. As the fast sensing scheme 1300 goes through several detection cycles, the adjustable time delay $T_{D2}$ of the second template signal 1224 substantially equals to $T_P/2+n*T_S$. Within each detection cycle, the received PCR signal 945 is being multiplied by two time-shifted template signals (e.g., the first template signal 1222 and 1224).

As a result, the maximum number of time delay adjustments can be reduced from about $T_P/T_S$ to about $T_P/(2*T_S)$. When compared to the radar sensor 900, the high speed radar sensor 1200 can sweep the entire detectable range with half of the detection cycles. Although FIG. 13 shows that two time-shifted template signals are used, the high speed radar sensor 1200 may use three or more template signals to further improve the speed of the detection process. For example, when three template signals are used along with three integrator modules, the total sweep time can be reduced to one-third of the original sweep time.

Referring again to FIG. 12, the analog correlator module 1210 includes a second VTDC 1225 and a second CTDC 1227 along the sampling path. The second VTDC 1225 performs similar functions as the second VTDC 928 as discussed in FIG. 9. As such, the second VTDC 1225 can be adjusted by the timing controller 926 and in manner similar to the second VTDC 928.

The second VTDC 1225 generates a first time-shifted sampling signal 1226, which is sent to the first ADC 1236 and the second CTDC 1227. The first time-shifted sampling signal 1226 is used for controlling the sampling rate of the first ADC 1236. Upon receiving the first time-shifted sampling signal 1226, the second CTDC 1227 will generate a second time-shifted sampling signal 1228. The second time-shifted sampling signal 1228 is used for controlling the sampling rate of the second ADC 1238. In order to coordinate the operations of the first multiplier 1232, the first integrator module 1260, and the first ADC 1236, the sampling rate of the first time-shifted sampling signal 1226 is substantially synchronized with the replication rate of the first template signal 1222. Similarly, in order to coordinate the operations of the second multiplier 1234, the second integrator module 1280, and the second ADC 1238, the sampling rate of the second time-shifted sampling signal 1228 is substantially synchronized with the replication rate of the second template signal 1224.

As discussed so far, each of the integrator modules within the integrator bank 1250 may share similar physical properties in the parallel architecture. For example, the charge storage component of each integrator may have similar time constants and the discharge path of each integrator may be similarly configured. However, according to various alternative implementations, the integrator bank 1250 may include several integrator modules, each with different physical properties. Such asymmetric arrangement allows the integrator bank 1250 to process code sequences with various code lengths. Generally, long coded pulses can be used for detecting far targets while short coded pulses can be used for detecting near targets. To accommodate both long coded pulses and short coded pulses, the analog correlator module may selectively activate the integrators with larger time constants and the integrators with smaller time constants.

Figure 14:
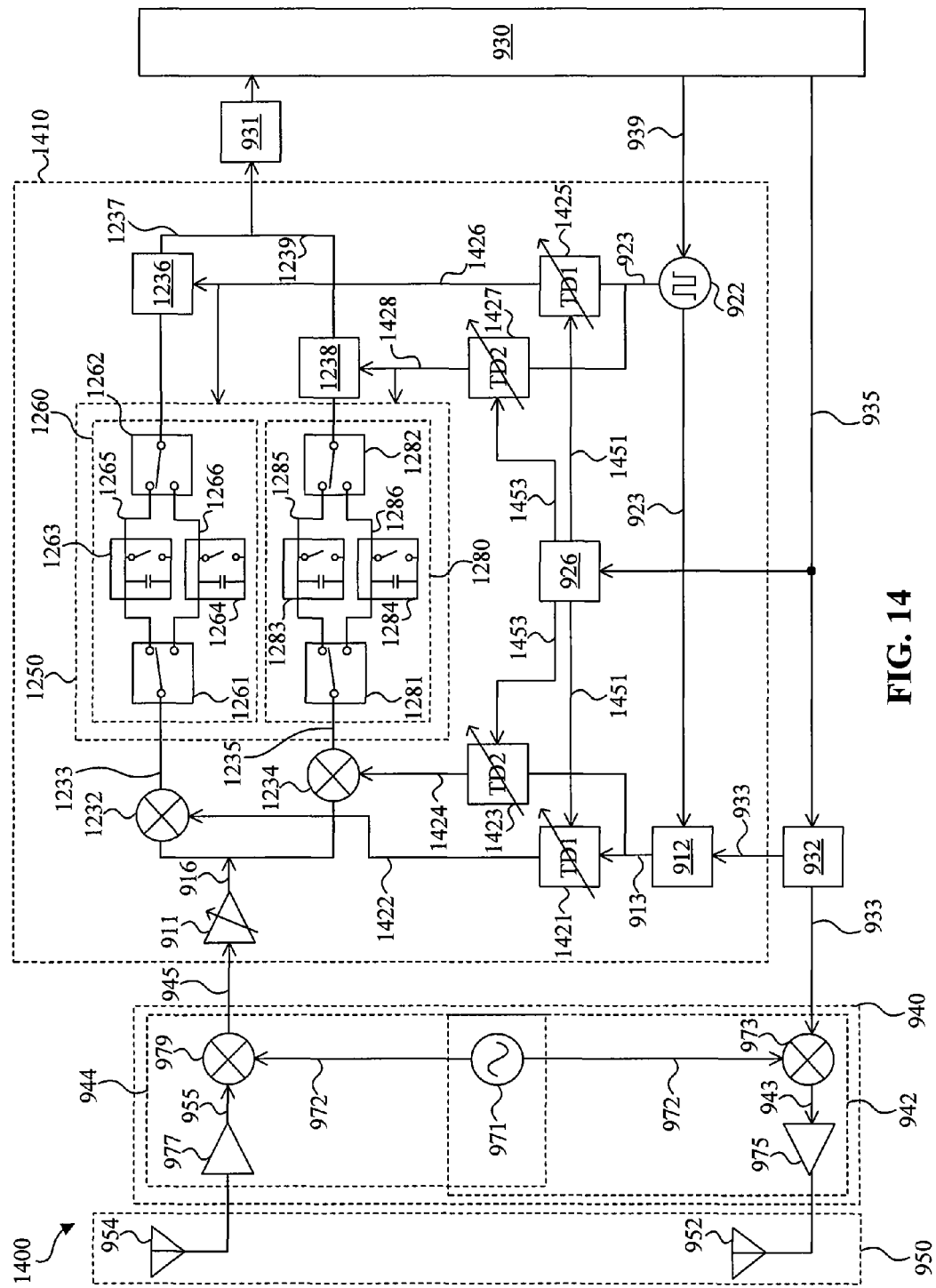
FIG. 14 shows a schematic diagram of a motion sensing radar sensor according to a fourth embodiment of the present invention.

FIG. 14 shows a schematic diagram of a motion sensing radar sensor 1400 according to a fourth embodiment of the present invention. When compared to high speed radar sensor 1200, the motion sensing radar sensor 1400 includes several modifications. For example, the time shifting (or time delaying) components within the analog correlator module 1210 is modified to perform a high speed motion sensing scheme.

The motion sensing scheme involves detecting a first position of a target at a first instance of time and detecting a second position of the same target at a second instance of time. After detecting the first position, the motion sensing scheme correlates the next received PCR pulse with a pair of template signals. The pair of template signals is time-shifted or delayed in opposition directions (e.g., forward direction and backward direction). Depending on whether the target is moving closer to or farther away from the motion sensing radar sensor 1400, one of the template signals establish a correlation with the next received PCR pulse. As such, the motion sensing scheme detects the second position by using the correlated template signal.

By comparing the first detected position with the second detected position, the motion sensing scheme determines a movement of the target. Because the motion sensing scheme is designed to compare the detected target with template signals going towards both forward and backward directions, the motion sensing scheme sense the movement of a fast moving target in a more robust manner than the previously discussed schemes.

More specifically, the analog correlator module 1410 includes a first backward variable time delay component VTDC 1421, a first forward VTDC 1423, a second backward VTDC 1425, and a second forward VTDC 1427. The timing controller 926 generates a backward delay adjustment signal 1451 for enabling one or more time delay elements of the first backward VTDC 1421 and the second backward VTDC 1425. The timing controller 926 also generates a forward delay adjustment signal 1453 for enabling one or more time delay elements of the first forward VTDC 1423 and the second forward VTDC 1427.

Based on the backward delay adjustment signal 1451, the first backward VTDC 1421 generates a first backward template signal 1422. The first backward template signal 1422 is multiplied with the amplified PCR signal 916 to generate the first multiplied signal 1233. In return, the first multiplied signal is used for generating the first analog correlation signal 1265 and the second analog correlation signal 1266.

Similarly, based on the forward delay adjustment signal 1453, the first forward VTDC 1423 generates a first forward template signal 1424. The first forward template signal 1424 is multiplied with the amplified PCR signal 916 to generate the second multiplied signal 1235. In return, the first multiplied signal is used for generating the third analog correlation signal 1285 and the fourth analog correlation signal 1286.

In determining the movement of the target, the detection controller 930 compares the consecutive autocorrelation magnitudes among the first analog correlation signal 1265, the second analog correlation signal 1266, the third analog correlation signal 1285, and the fourth analog correlation signal 1286. In one implementation, for example, the detection controller 930 may determine that the target has a backward movement if the autocorrelation magnitudes of the first analog correlation signal 1265 and/or the second analog correlation signal 1266 pass the predetermined threshold for a consecutive numbers of detection cycles. In another implementation, for example, the detection controller 930 may determine that the target has a forward movement if the autocorrelation magnitudes of the third analog correlation signal 1285 and/or the fourth analog correlation signal 1286 pass the predetermined threshold for a consecutive numbers of detection cycles.

Figure 15:
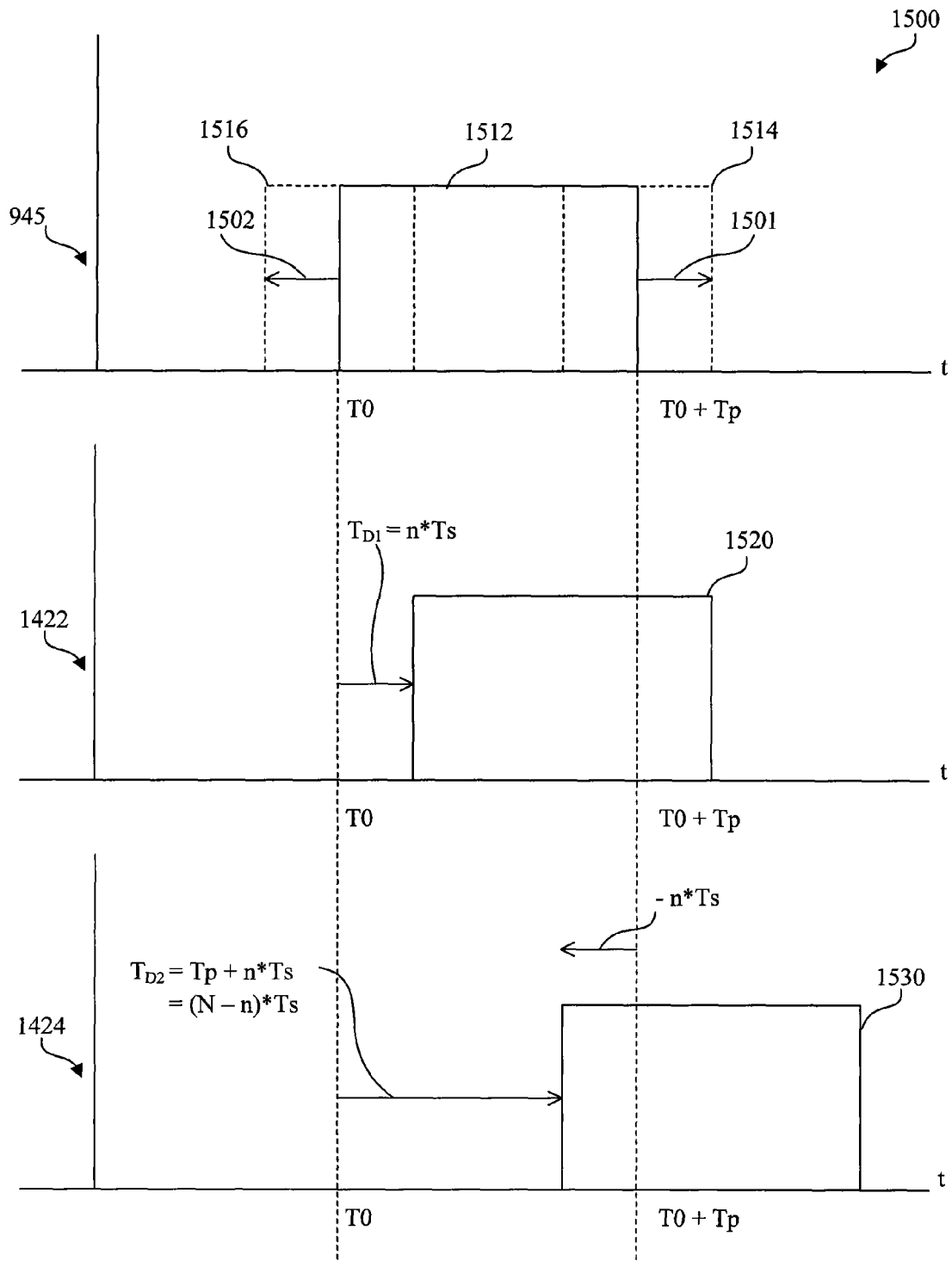
FIG. 15 shows various waveform diagrams of various signals in a motion sensing scheme according to the fourth embodiment of the present invention.

To further elaborate on the operation of the motion sensing scheme, FIG. 15 shows the waveform diagrams of various signals from a motion sensing scheme 1500 according to the fourth embodiment of the present invention. As discussed herein, the motion sensing scheme 1500 represents only one of the many motion sensing schemes which the analog correlator module 1410 can execute. The motion sensing scheme 1500 may be further modified to meet other design goals. As such, the motion sensing scheme 1500 may demonstrate but does not limit the general scope and concept of the analog correlator 1410.

For the sake of simplicity, FIG. 15 shows that the motion sensing scheme 1500 has already detected a first position of a moving target during a previous detection cycle. The detected first position is represented by a correlated PCR pulse 1512 of the amplified PCR signal 916. In the current detection cycle, the moving target may remain in the first position, move closer to the radar sensor 1400, or move farther away from the radar sensor 1400.

If the target is to remain stationary, the next amplified PCR pulse will have the same temporal position as the correlated PCR pulse 1512. If the target is to move closer to the radar sensor 1400, the next amplified PCR pulse will overlap with a backward moving PCR pulse 1514. The backward moving PCR pulse 1514 has a backward temporal displacement 1501 relative to the correlated PCR pulse 1512. If the target is to move farther away from the radar sensor 1400, the next amplified PCR pulse will overlap with a forward moving PCR pulse 1516. The forward moving PCR pulse 1516 has a forward temporal displacement 1502 relative to the correlated PCR pulse 1512.

In order to determine whether the backward moving PCR pulse 1514 or the forward moving PCR pulse 1516 is presented in the amplified PCR signal 916, the motion sensing scheme 1500 correlates the amplified PCR signal 916 with the backward template signal 1422 and the forward template signal 1424. The backward template signal 1422 includes a backward PCR pulse 1520. Assuming n is the number of detection cycles after the initial detection cycle, the backward PCR pulse 1520 may have a backward time delay $T_{D1}$ of about $n*T_S$.

On the other hand, the forward template signal 1424 includes a forward PCR pulse 1530. Assuming n is the number of detection cycles after the initial detection cycle, the forward PCR pulse 1530 has a forward time delay $T_{D1}$ of about n*$T_S$. The backward time delay $T_{D1}$ may be reference to the start time T0 of the correlated PCR pulse 1512, while the forward time delay $T_{D2}$ may be reference to the end time $T_0+T_P$ of the correlated PCR pulse 1512. In order to established the same reference point as the backward time delay TD1, the forward time delay $T_{D2}$ can be expressed as (N−n)*$T_S$, where N is the ratio of the PCR pulse width $T_P$ over the unit sub-pulse width $T_S$.

Once the amplified PCR signal 916 is correlated with the backward PCR pulse 1520 or the forward PCR pulse 1530, the motion sensing scheme 1500 determines whether the target is moving forward or backward.

Referring again to FIG. 14, the second backward VTDC 1425 generates a backward sampling signal 1426, and the second forward VTDC 1427 generates a forward sampling signal 1428. The backward sampling signal 1426 is sent to the first ADC 1236, and it is used for controlling the sampling rate of the first ADC 1236. Similarly, the forward sampling signal 1428 is sent to the second ADC 1238, and it is used for controlling the sampling rate of the second ADC 1238.

In order to coordinate the operations of the first multiplier 1232, the first integrator module 1260, and the first ADC 1236, the sampling rate of the backward sampling signal 1426 is substantially synchronized with the replication rate of the backward template signal 1222. Similarly, in order to coordinate the operations of the second multiplier 1234, the second integrator module 1280, and the second ADC 1238, the sampling rate of the forward sampling signal 1428 is substantially synchronized with the replication rate of the forward template signal 1424.

Although FIGS. 12 and 14 show that the high speed radar sensor 1200 and the motion sensing radar sensor 1400 are two separated embodiments, one or more structural features of the high speed radar sensor 1200 and of the motion sensing radar sensor 1400 may be combined to form a single embodiment. Accordingly, the combined embodiment will have the functional advantages of both the high speed radar sensor 1200 and the motion sensing radar sensor 1400. Moreover, although the present disclosure only discusses the motion sensing scheme within the framework of the motion sensing radar sensor 1400, other motion sensing schemes may also be implemented within the framework of the radar sensor 100, the radar sensor 900, and the high speed radar sensor 1200.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

Those skilled in the art will appreciate that various adaptations and modifications of the just-described preferred embodiment can be configured without departing from the scope and spirit of the invention. Therefore, it is to be understood that, within the scope of the amended claims, the invention may be practiced other than as specifically described herein.

What is claimed is:

1. An analog correlator for use in a radar sensor having a transmitter for transmitting a pulse compression radar (PCR) signal having a PCR pulse and a receiver for receiving a reflected PCR signal, the analog correlator comprising:
   a replica generator for generating a template signal having a plurality of replicated PCR pulses replicating the PCR pulse of the transmitted PCR signal, the plurality of replicated PCR pulses generated at a replication rate having an adjustable time delay relative to the transmitted PCR signal;
   a multiplier for multiplying the received PCR signal with the plurality of replicated PCR pulses of the template signal; and
   an integrator module coupled to the multiplier, and configured to generate a plurality of analog correlation signals, each having a magnitude based on the multiplying between the received PCR signal and one of the plurality of replicated PCR pulses of the template signal.

2. The analog correlator of claim 1, wherein each of the plurality of replicated PCR pulses includes a sub-pulse defining a range resolution of the radar sensor, and wherein the adjustable time delay is a multiple of a pulse width of the sub-pulse.

3. The analog correlator of claim 1, further comprising:
   an analog-to-digital converter (ADC) configured to convert the plurality of analog correlation signals to a plurality of digital signals at a rate substantially synchronizing with the replication rate of the plurality of replicated PCR pulses.

4. The analog correlator of claim 1, wherein the multiplier is configured to generate a plurality of correlation charges, each of the plurality of correlation charges representing a correlation between the received PCR signal and one of the plurality of replicated PCR pulses.

5. The analog correlator of claim 4, wherein the integrator module includes:
   a first integrator configured to generate a first analog correlation signal of the plurality of analog correlation signals upon receiving a first correlation charge of the plurality of correlation charges from the multiplier.

6. The analog correlator of claim 5, wherein the integrator module includes:
   a second integrator configured to generate a second analog correlation signal of the plurality of analog correlation signals upon receiving a second correlation charge of the plurality of correlation charges from the multiplier, and
   a switch configured to couple only one of the first integrator and the second integrator to the multiplier during a pulse width of one of the plurality of replicated PCR pulses.

7. The analog correlator of claim 6, wherein the switch is configured to couple the first integrator and the second integrator to the multiplier at an alternate sequence synchronizing with the replication rate of the plurality of replicated PCR pulses.

8. The analog correlator of claim 6, wherein each of the first and second integrators includes:
   a capacitor for receiving and accumulating the first or second correlation charge when the respective first or second integrator is coupled to the multiplier, and
   a discharge path for substantially releasing the first or second correlation charge from the capacitor when the respective first or second integrator is disconnected from the multiplier.

9. The analog correlator of claim 1, further comprising:
   a sampling clock generator configured to generate a sampling signal having a sampling rate and driving the replica generator to replicate the PCR pulse of the transmitted PCR signal at the replication rate.

10. The analog correlator of claim 9, further comprising:
    an adjustable time delay device coupled between the sampling clock and the replica generator, and configured to delay the sampling signal by the adjustable time delay.

11. The analog correlator of claim 1, further comprising:
an adjustable time delay device coupled between the replica generator and the multiplier, and configured to delay the template signal by the adjustable time delay.

12. The analog correlator of claim 1, further comprising:
a variable gain amplifier connected to the receiver, and configured to amplify the received PCR signal based on a time period starting around the transmission of the PCR signal, the amplified reflector PCR signal received by the multiplier for multiplying with the template signal.

13. An analog correlator for use in a radar sensor having a transmitter for transmitting a pulse compression radar (PCR) signal having a PCR pulse and a receiver for receiving a reflected PCR signal, the analog correlator comprising:
a replica generator for generating a first template signal and a second template signal, each of the first and second template signals having a plurality of replicated PCR pulses replicating the PCR pulse of the transmitted PCR signal at a replication rate, the first template signal delayed from the transmitted PCR signal by a first adjustable time, the second template signal delayed from the transmitted PCR signal by a second adjustable time, the first adjustable time and the second adjustable time relatively defined by a pulse width of the PCR pulse;
a multiplier for multiplying the received PCR signal with the plurality of replicated PCR pulses of the first template signal and with the plurality of replicated PCR pulses of the second template signal; and
an integrator module coupled to the multiplier, the integrator module configured to generate a plurality of first analog correlation signals based on the multiplying between the received PCR signal and the plurality of replicated PCR pulses of the first template signal, and configured to generate a plurality of second analog correlation signals based on the multiplying between the received PCR signal and the plurality of replicated PCR pulses of the first template signal.

14. The analog correlator of claim 13, wherein the PCR pulse includes a sub-pulse defining a range resolution of the radar sensor, and wherein the first adjustable time is a multiple of a sub-pulse width of the sub-pulse.

15. The analog correlator of claim 14, wherein the second adjustable time is a sum of the first adjustable time and an offset time substantially equals to a fraction of the pulse width of the PCR pulse.

16. The analog correlator of claim 15, further comprising:
an adjustable time delay device configured to delay the first template signal by the first adjustable time; and
a constant time delay device cooperating with the first adjustable time delay device so as to delay the second template signal by the second adjustable time.

17. The analog correlator of claim 14, wherein the second adjustable time is defined by a difference between the pulse width of the PCR pulse and the first adjustable time.

18. The analog correlator of claim 17, further comprising:
a timing controller configured to compute the first adjustable time and the second adjustable time;
a first adjustable time delay device connected to the timing controller, and configured to delay the first template signal by the first adjustable time; and
a second adjustable time delay device connected to the timing controller, and configured to delay the second template signal by the second adjustable time.

19. The analog correlator of claim 13, further comprising:
a first analog-to-digital converter (ADC) configured to convert the plurality of first analog correlation signals to a plurality of first digital signals at a first conversion rate synchronizing with the first template signal; and
a second ADC configured to convert the plurality of second analog correlation signals to a plurality of second digital signals at a second conversion rate synchronizing with the second template signal.

20. The analog correlator of claim 13, further comprising:
a variable gain amplifier connected to the receiver, and configured to amplify the received PCR signal based on a time period starting around the transmission of the PCR signal, the amplified reflector PCR signal received by the multiplier for multiplying with the template signal.

21. A radar sensor, comprising:
a pulse generator for generating a pulse compression radar (PCR) signal for transmission, the PCR signal having a PCR pulse;
a variable gain amplifier (VGA) configured to amplify a received PCR signal based on a time period starting after the transmission of the PCR signal;
an analog correlator connected to the pulse generator, the analog correlator configured to:
generate a template signal including a plurality of replicated PCR pulses replicating the PCR pulse of the PCR signal at a replication rate having an adjustable time delay relative to the transmission of the PCR signal,
generate a plurality of analog correlation signals, each having a magnitude based on a multiplying between the amplified PCR signal and one of the plurality of replicated PCR pulses of the template signal, and
sample the plurality of analog correlation signals at a sampling rate substantially synchronizing with the replication rate; and
a controller connected to the analog correlator, the controller configured to detect a position of the target based on the sampled magnitude of each of the plurality of analog correlation signals, and configured to increase the adjustable time delay if the position of the target is not detected.

22. A radar system, comprising:
a pulse generator for generating a pulse compression radar (PCR) signal having a PCR pulse;
a transmitter module coupled to the pulse generator, and configured to transmit the PCR signal;
a receiver module configured to receive a reflected PCR signal from a target reflecting the transmitted PCR signal;
an analog correlator coupled with the pulse generator and the receiver module, the analog including:
a replica generator for generating a template signal having a plurality of replicated PCR pulses replicating the PCR pulse of the transmitted PCR signal, the plurality of replicated PCR pulses generated at a replication rate having an adjustable time delay relative to the transmitted PCR signal,
a multiplier for multiplying the received PCR signal with the plurality of replicated PCR pulses of the template signal, and
an integrator module coupled to the multiplier, and configured to generate a plurality of analog correlation signals, each having a magnitude based on the multiplying between the received PCR signal and one of the plurality of replicated PCR pulses of the template signal; and a controller coupled to the analog correlator, the controller configured to detect a position of the target based on the sampled magnitude of each of the plurality of analog correlation signals, and configured to increase the adjustable time delay if the position of the target is not detected.

23. The radar system of claim 22, wherein the multiplier is configured to generate a plurality of correlation charges, each of the plurality of correlation charges representing a correlation between the received PCR signal and one of the plurality of replicated PCR pulses.

24. The radar system of claim 23, wherein the integrator module includes:
   a first integrator configured to generate a first analog correlation signal of the plurality of analog correlation signals upon receiving a first correlation charge of the plurality of correlation charges from the multiplier,
   a second integrator configured to generate a second analog correlation signal of the plurality of analog correlation signals upon receiving a second correlation charge of the plurality of correlation charges from the multiplier, and
   a switch configured to couple only one of the first integrator and the second integrator to the multiplier during a pulse width of one of the plurality of replicated PCR pulses.

25. The radar system of claim 24, wherein:
   the switch is configured to couple the first integrator and the second integrator to the multiplier at an alternate sequence synchronizing with the replication rate of the plurality of replicated PCR pulses, and
   each of the first and second integrators includes:
   a capacitor for receiving and accumulating the first or second correlation charge when the respective first or second integrator is coupled to the multiplier, and
   a discharge path for substantially releasing the first or second correlation charge from the capacitor when the respective first or second integrator is disconnected from the multiplier.

* * * * *